(12) United States Patent
Hussie

(10) Patent No.: US 7,136,192 B2
(45) Date of Patent: Nov. 14, 2006

(54) COLOR CORRECTION METHOD WITH IMPROVED IMAGE TRANSLATION ACCURACY

(75) Inventor: Andrew F. Hussie, Somerville, MA (US)

(73) Assignee: Master Colors, Santa Barbara, CA (US)

( * ) Notice: Subject to any disclaimer, the term of this patent is extended or adjusted under 35 U.S.C. 154(b) by 369 days.

(21) Appl. No.: 10/862,230

(22) Filed: Jun. 7, 2004

(65) Prior Publication Data

US 2005/0280845 A1 Dec. 22, 2005

(51) Int. Cl.
*G06K 15/00* (2006.01)
*H04N 1/46* (2006.01)

(52) U.S. Cl. .................. 358/1.9; 358/518; 358/530

(58) Field of Classification Search ............. 358/1.9, 358/2.1, 500, 518, 519, 515, 530
See application file for complete search history.

(56) References Cited

U.S. PATENT DOCUMENTS 5,471,675 A * 11/1995 Zias .......................... 345/501

| | | | |
|---|---|---|---|
| 2004/0049497 A1* | 3/2004 | Curry et al. | 707/3 |
| 2004/0052429 A1* | 3/2004 | Curry et al. | 382/274 |
| 2004/0056835 A1* | 3/2004 | Curry et al. | 345/100 |

FOREIGN PATENT DOCUMENTS

JP 2000324350 * 11/2000

* cited by examiner

*Primary Examiner*—Jerome Grant, II
(74) *Attorney, Agent, or Firm*—Robert Schuler

(57) ABSTRACT

A color correction method utilizes a specially designed, perceptually ordered, intermediate color space and color value information from an original source device image and color value information from a repositioned source device image to quantify the accuracy of a color image translation process. The color correction method operates, under user control, to convert original source device image color values to intermediate space color values, where the color values can be analyzed to determine whether or not all of them are positioned within the gamut of a target device. If all of the original source device color values are not positioned within the gamut of the target device, the user can reposition these colors so that all or substantially all of the color values are contained within the gamut of the target device. After the color values are repositioned, an aggregate image closeness term and a proportion conservation term are calculated and the sum of these two terms is a scalar quantity equivalent to the accuracy of the image translation process.

27 Claims, 12 Drawing Sheets

COLOR CORRECTION METHOD WITH IMPROVED IMAGE TRANSLATION ACCURACY

FIELD OF THE INVENTION

This invention generally relates to color management systems that take an image that exists in one medium and translate it into another different medium. More specifically, the invention relates to color management systems that accurately translate a color image from on original medium to another different medium such that the translated color image most closely resembles the original image.

BACKGROUND OF THE INVENTION

In certain fields of work such as the development of printing technology, scanning technology, digital and film photography, and color correction in the movie film industry, there is very frequently a need to efficiently translate a color image that exists in one medium over to another medium in such a way that the colors of the image, as displayed by both mediums, do not appear to change. This is known as color translation accuracy. For instance, a developer of printing technology may want to translate an image that has been created with a graphical art image editing application or that has been scanned into a computer into an image consisting of ink on paper that most accurately resembles the monitor image. Or someone involved with the post production of movie film may want to copy an image that exists on film onto a computer monitor with the least amount of distortion, and then may want to convert that image back onto film.

The principle difficulty in accurately and efficiently translating a color image from one medium to another lies in the limits to the range of colors each medium is able to display. A color space, which is also known as a color gamut or simply gamut, is an ordered structure containing a broad range of colors arranged in a way that is analogous to physical space, i.e. multiple dimensions, each axis perpendicular to the others. For instance, RGB is the color space typically used by CRT's and contains red, green and blue axes, where individual points or pixels in this space are colors composed of levels of red, green and blue light. CMYK is another color space typically used by color printers that contains cyan, magenta, yellow, and black axes, where individual pixels in this space are colors composed of cyan, magenta, yellow, and block light levels. In the event that a color space associated with one medium may have greater or fewer colors than the color space associated with another medium, it becomes necessary for the color image translation process to correct or adjust the original images colors during the translation process in order for them to be displayed in another color space. Prior art color image translation methods tend to distort the displayed color contrast relationships, as between the original and translated color image, resulting in an image that does not exhibit the same colors or color contrast as the original.

A number of different prior art methods have been developed that attempt to accurately perform the color image translation process. One method employed was to simply map, as closely as possible, all of the colors in one color space, RGB for example, directly to the colors of another color space, CMYK for example. Due to the differences in RGB and CMYK display technologies (illumination vs. ink), it is not possible to construct a mapping scheme which will accurately display the original RGB colors in CMYK color space. Very often, the resulting translated image colors do not, to the human eye, resemble the colors of the original color image. Consequently, the colors of the resulting translated image may have to be manually adjusted until the color relationships in this image, are deemed an accurate translation according to human eyes and judgment. This is a very time consuming, difficult process, and so it would be desirable to have an efficient method that automates certain steps of the process in order to achieve a level of color image translation accuracy.

Prior art color image translation methods are known that translate a color image from a source medium to a target medium using a process that automatically accounts for some basic color image translation accuracy. These methods vary from each other with respect to how they handle the difference in the gamuts available to the source and target mediums. Different color gamuts can mean, for instance, that the source medium may be capable of displaying very light colors, but not dark colors, while the target medium, which would display the translated image, may only be capable of displaying dark colors and not light colors. These color image translation methods all utilize some form of an intermediate color space to permit the differences between the source and target medium's gamuts to be analyzed and identified so that only those colors outside the target mediums gamut need to be adjusted. Thus if the original image contains colors which cannot be displayed by the target medium, certain remedial steps must be taken to ensure that all colors in the original image can be displayed by the target medium while still achieving the most accurate result. This manual, remedial process is iterative and can take quite a lot of time.

Typically, image translation methods handle this problem by adjusting the colors of an original image in an intermediate color space until most or all of the colors exist in the range or gamut of the target medium. To adjust all colors of an image from one original gamut to another target gamut in an intermediate color space is to adjust every color with respect to one or more axes in the direction of the target gamut. For instance, using the RGB space, the modified image may be significantly greener than the original image.

As mentioned above, color image translation methods which use a color adjustment approach utilize a variety of intermediate color spaces. The great majority of these spaces are non-perceptual color spaces. This means that the colors within this type of color space are arranged on the axes in a way which is convenient to the operation of a machine, or some hardware device, but of questionable relevance to human perception. This creates problems when striving for accuracy. When all of the colors of the original image are brought into the target gamut through such an intermediate space, then the resulting colors will have changed from the original in an unpredictable fashion, in ways which do not agree with human judgment, and thus detrimental to the process of achieving accuracy. After having brought the colors of the original image into the gamut of the target medium through a non-perceptual space, there might remain a number of adjustments to be performed on the colors to bring the resulting image closer to what is considered accurate. With existing color image translation methods, many of these adjustment operations become necessary due to the limitations of the non-perceptual intermediate color spaces used, and the adjustments are designed to counter the distortions of this non-perceptual space. It is more desirable to be able to adjust the colors through an intermediate perceptual color space, one in which the colors have been arranged along the axes with the aid of human judgment for the purpose of visual consistency, such that the adjustment brings the colors to what the discerning human eye expects to see, as well as within the gamut of the target medium.

The use of a perceptual color space eliminates the need for the adjustment operations associated with non-perceptual color spaces. However, as previously described, there are problems inherent in the translation of colors from a source gamut to a target gamut which require remedial operations to achieve accuracy, regardless of the color space used. When adjusting a group of colors from one gamut to another very different gamut some of the colors may be cut off, or excluded, from the boundaries of the new gamut. For example, the original gamut may contain a broad spread of dark through light colors, and the new gamut may be lighter overall and contain a smaller spread of dark through light, defining a tighter color space. When the image is lightened or up-shifted into the new gamut, the former darkest colors fit easily into the darkest area of the new gamut, but the lightest colors no longer fit, since they are cut off by the tighter boundary of the new gamut. Remedial operations must be executed to make all of the colors fit into the new gamut and maintain their relative positions as closely as possible to achieve the greatest accuracy. We will call the process of executing such remedial operations relative repositioning or simply repositioning. Existing repositioning operations, such as color shifting, clipping, and scaling tend to be a patchwork of hit or miss estimations and/or difficult, error-prone observations all of which are very subjective. The subjective nature of the existing color translation accuracy evaluation processes results in a tedious, expensive, and often fruitless utilization of a technicians' time.

Therefore, it would be advantageous to employ a color image translation process that is able to objectively, rather than subjectively, evaluate the accuracy with which colors are repositioned during this translation process. More specifically, it would be advantageous if a color image translation process calculated a scalar quantity indicative of the accuracy with which colors are repositioned during the translation process.

SUMMARY OF THE INVENTION

The above described problems associated with accuratly repositioning colors during the color image translation process are overcome by my invention. In the preferred embodiment, my invention enables one to objectively measure the accuracy with which colors are repositioned during the image translation process by calculating at least two color contrast ratios between at least three of the colors in a color image prior to repositioning any of the colors which results in a proportional relationship, recalculating contrast ratios between the same colors after the repositioning process which may result in different proportional relationships, and then evaluating the differences between the proportional relationships calculated before and after the repositioning process. In another embodiment, the repositioning accuracy is measured by utilizing both proportional information and aggregate image closeness information. In another embodiment, the proportional and aggregate image closeness information are weighted differently. In yet another embodiment, the proportional and aggregate image closeness information are weighted the same.

DETAILED DESCRIPTION OF THE INVENTION

Figure 1:
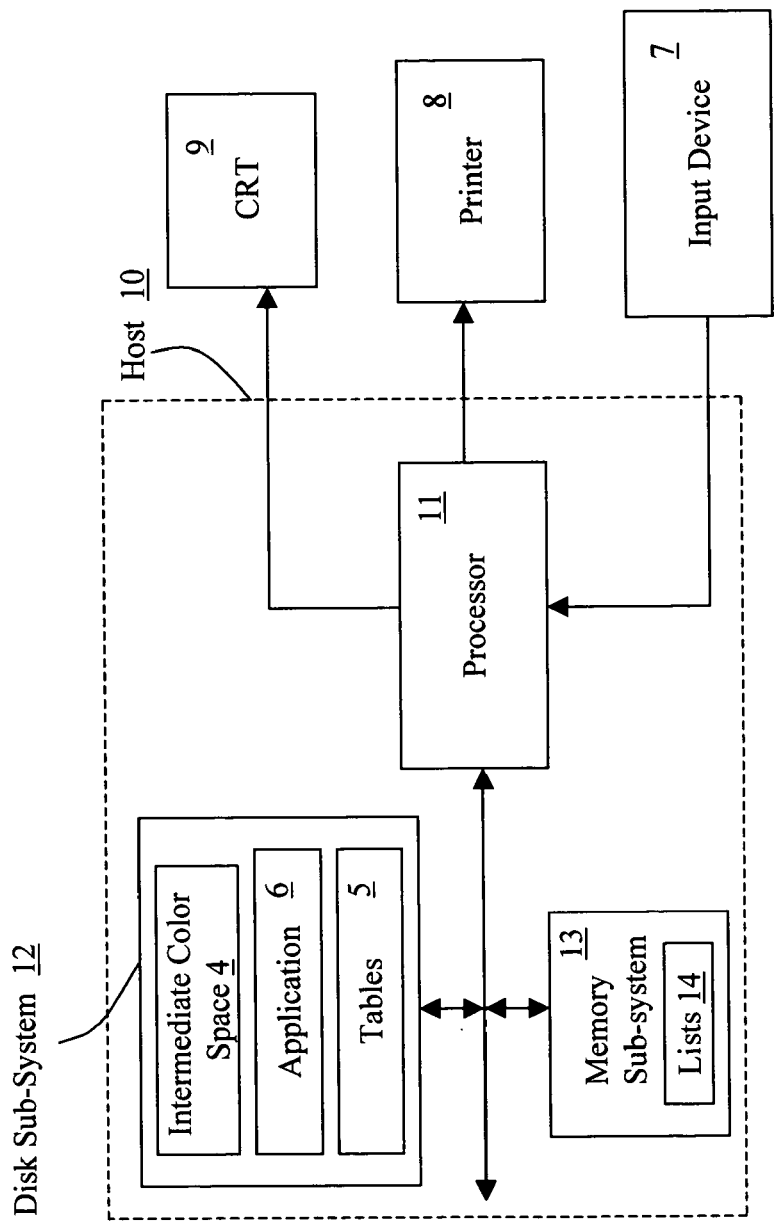
FIG. 1 is a functional block diagram showing a computer and peripherals used to implement the invention.

Referring to FIG. 1, the host computer (10) can be any commercially available computer system with the capacity to run the application (6) and has a central processor (11) in communication with a disk sub-system (12), a memory sub-system (13), and a variety of peripheral devices (7), (8), & (9) for example. The disk sub-system functions as permanent storage for various software systems needed in order for the host to operate. For instance, this software could be an operating system (not shown), device drivers (not shown), color correction application software (6) to accurately translate color images from a source medium to a target medium, and look-up tables (5) to convert color image value information from the format of a source medium, for example, to another format. At the time of host initiation or boot, portions or all of certain software systems are loaded into the memory sub-system and are accessed by the processor (11) to operate on information provided by a user or the application to make changes to a color image.

Continuing to refer to FIG. 1, the host computer (10) is in communication with a number of peripherals some of which function to display images, communicated to them by the host, either on some sort of screen or on paper, and others of which permit a user to enter information into the host computer either via a keyboard or scanner or some other device More specifically these peripheral devices could be an input device (7), which could be a keyboard or scanner, a printer (8), and CRT (9). The keyboard and/or scanner can be used to input information into the host to be processed and later displayed on the CRT or printed by the printer.

In operation, the color correction application (6) shown in FIG. 1, hereinafter simply referred to as the application, generally functions to accurately and efficiently translate color images from a source medium, which could be the CRT (9) to a target medium which could be the printer (8) for instance. More specifically with respect to the color image translation process, a color image could be created by a user via keyboard operations or scanned into the host and stored in memory, and if selected, the image could be displayed on the CRT (9). Typically, the process for creating or editing an image in a system such as host (10) is an iterative, visual process, where the artist enters commands that direct the processor (11) to place a color or colors, in a particular format, at specific positions on a screen to form a color image. Any standard color editing application, such as the Microsoft® PictureIt® application, could be used to create and edit such an image. Once the color image is complete, the artist may elect to make a paper copy of the image. In order to accurately translate the color image created in CRT medium to a color image printed on paper, the application (6) translates the image through an intermediate, perceptually ordered, equal step, color space (4), where the image color values can be repositioned, with respect to the original source, CRT medium values, so that the printed image will visually appear to be very similar to the image as it originally appeared in the source medium. This intermediate color space has been specifically designed for use with the application (6) and will be discussed in detail later in this application. The image color values mentioned above generally refer to the absolute position occupied by a single color in some color space. Color value will be described in detail later in this application.

Continuing to refer to FIG. 1, the application (6) generally operates to perform the color image translation process by utilizing lookup tables (5) to convert a plurality of source medium image color values to intermediate color space (4) image color values. The use and construction of such a lookup table to convert color values from one medium to another is well known to those skilled in the art and so will not be discussed in detail in this application. After making this initial conversion to intermediate color space image color values, the application (6) then calculates at least two color contrast values between at least three of intermediate color space image color values. The result of this calculation is a proportional value between the three color values which will be used later to calculate color translation accuracy. Next, the application converts the target medium image color values to intermediate color space image color values, and compares the source image values, now converted to intermediate space values, to the target gamut color values. Depending upon the result of this comparison, the user may want to reposition some or all of the source color values within the intermediate color space. At this point, a scalar quantity indicative of the translation accuracy is calculated using the proportional value calculated above and/or using an aggregate image closeness value, both of which will be explained in detail later in this application. The resulting translated image color values, whether repositioned or not, are converted to the target medium color values, are sent to the target medium where they could be displayed or printed on paper, for instance.

The method of the invention is best achieved by implementing the intermediate color space (4) discussed with reference to FIG. 1. This color space is perceptual, meaning that the axes along which the colors are placed are perpendicular, or the visual characteristic enumerated by one axis has no influence over the visual characteristic enumerated by the other axes. No color may appear more than once within this dimensional structure. Further, the colors must be arranged along the axes in a visually steady and consistent fashion, such that as they progress along their axes representing the magnitude of a certain visual quality, they must be able to be divided into visually equal units of contrast magnitude, referred to hereafter as color contrast steps or simply steps, as perceived by a qualified set of individuals. FIG. 2a is a three dimensional representation of the intermediate color space (4) of FIG. 1 showing three visually equal chroma steps (27a, 27b, and 27c) and three visually equal value steps (28a, 28b, and 28c). For reasons which will be explained later, I have defined one chroma step to be equal to 8 value steps.

Figure 2:
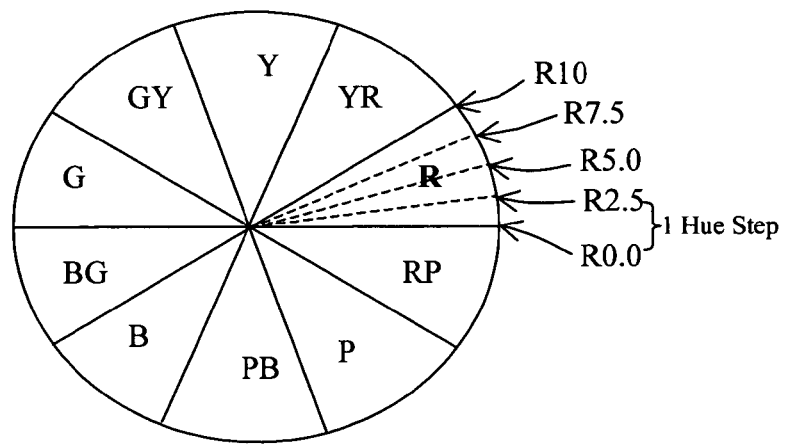
FIG. 2 is a color wheel illustration showing different hues.
Figure 2A:
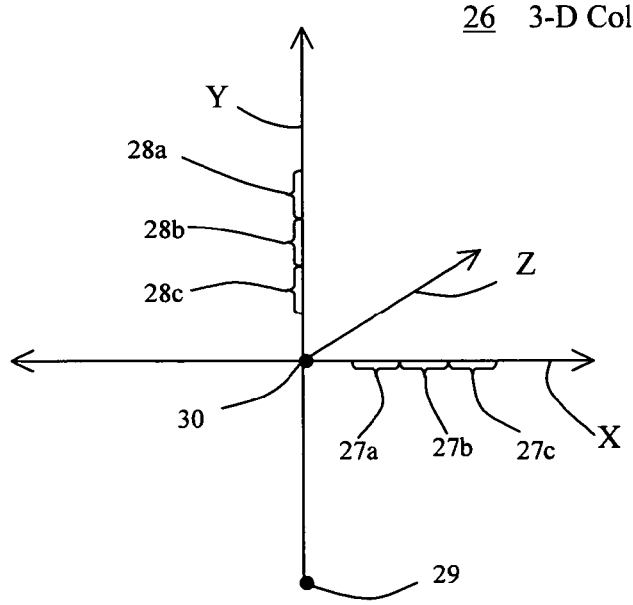
FIG. 2a is an illustration of three dimensional color space.
Figure 3:
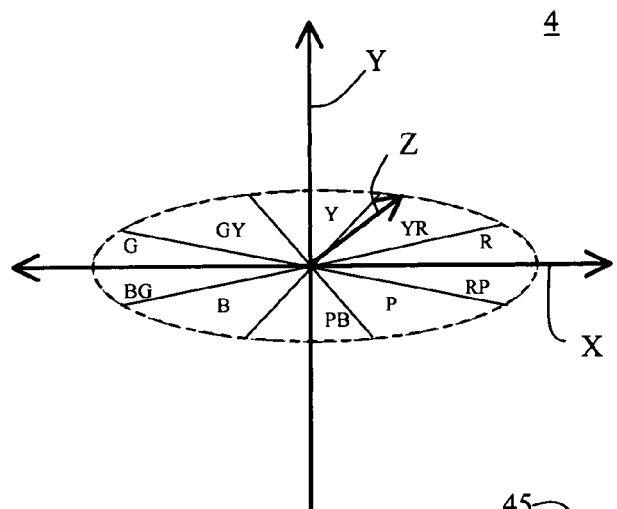
FIG. 3 is an illustration of three dimensional color space with the hue color wheel included.

A suitable intermediate, perceptual color space, one that is convenient and effective for achieving the method of the invention, is the modified HVC color space shown in FIGS. 2, 2a, and 3. FIG. 2a illustrates such an intermediate, perceptual color space having three axes which represent visual qualities of the three dimensional space. The three axes are hue (Z), value (Y), and chroma (X). Each color within the intermediate color space has unique numerical quantities or magnitudes of hue, value, and chroma. Referring to FIG. 2a, the vertical value axes (Y) identifies the color's lightness, or how light or dark the color is. The higher the value is, the lighter the color. A value of zero (29) tends to be the darkest possible color under the circumstances, or black. The horizontal chroma axes (X) identifies the intensity of a color's hue. The lower the chroma, the less intense the color is, with a chroma of zero (30) being the equivalent of a neutral gray. Higher chroma indicates higher intensity, such as, in the case of a red hue, a very bright red color. As shown in the color wheel of FIG. 2, hue identifies the color's particular commonly understood color group, i.e., red, yellow, green, blue and the like. The hue axis (Z) is cyclical, that is, it may be increased to the point where it cannot be further from the starting point, and any further increase will bring it closer to the beginning. This cyclical characteristic of hue is analogous to the color spectrum, which progresses from red to yellow to green to blue to violet, back to red.

Figure 4:
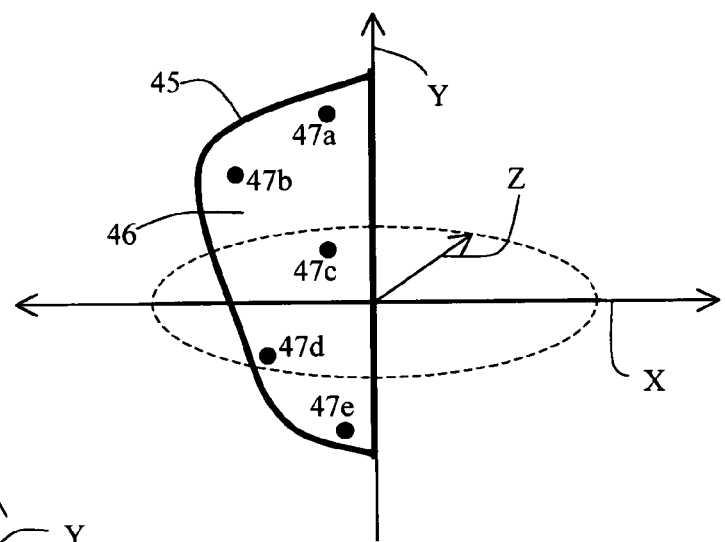
FIG. 4 illustrates a hue page in terms of the intermediate color space.

While the value and chroma axes shown in FIG. 2a have linear scalar quantities which describe them, i.e., 0, 1, 2, 2.6, 5.96, 20, etc., the hue axis has a special numbering system. With reference to the color wheel of FIG. 2, hue is divided into 10 groups, or hue names. They are Red (R), YellowRed (YR), Yellow (Y), GreenYellow (GY), Green (G), BlueGreen (BG), Blue (B), PurpleBlue (PB), Purple (P), and RedPurple (RP) (continuing back to Red). These groups are further divided into scalar quantities which indicate the nuance between groups. This quantity lies on a scale of 0 through 10, excluding 0. The notation for a hue's group along with its quantity indicating how close it is to the next group would appear as: R 6.7, GY 0.4, P 9.8 and the like. Other notation formats may have the number appearing before the group and so the color notation would appear as 6.7 R. For the purposes of this description, the former notation will be used. It is common to divide the axis into 40 parts as 4 quantities per 10 groups, appearing as R 2.5, R 5, R 7.5, R 10, YR 2.5, YR 5, YR 7.5, YR 10, etc. FIG. 3 is the combination of FIGS. 2 and 2a and is a three dimensional representation of the intermediate color space (4). Further with regard to hue, it is convenient at this point to describe the meaning of the term "hue page". Referring to FIG. 4, you will see the three dimensional intermediate color space illustrated without the different hues listed. The two dimensional color space designated (46) is defined by the bold line (45) and is in the plane of axes Y and Z of the intermediate color space (4). The five bold dots labeled (47a–e) represent colors in this two dimensional color space. All of the five colors have the same hue, and some of the colors could have the same value or the same chroma, but none of the five colors have the same value and chroma.

One of the characteristics of a perceptual color space is that no change in color value along any axis of the space will alter the value of the color with relation to any other axis. For example, a change in the value of hue will not inherently influence the value or chroma of a color. There are limitations on the extent of the possible magnitudes capable within the axes dependent upon the display technology used, i.e. whether the color space represents colors on a monitor or in ink. So colors associated with any particular display technology are capable of only a finite range of value, generally ranging from 0 to whatever the lightest possible color may be. There is also a maximum magnitude for chroma for each individual pair of hue and value quantities. For instance, a color of hue R 5 and value 6 may be capable of having a maximum chroma of 22, or a color of BG 7.5 and value 8 may be capable of having a maximum chroma of 4.5. It is assumed the maximum chroma for the lowest value, which is black, and the highest value, which is white, is zero, and that the maximum chroma possible is generally larger for the values in the middle. There is no limitation for the hue axis since it is cyclical, though the maximum chromas for some hues will generally be less than they would be for other hues.

The intermediate color space (4) of the present invention is similar to but has been modified from the color space followed by the Munsell Color System, which uses the three axes of hue, value and chroma to describe colors. The Munsell Color System is described in "The Munsell Color System A Language of Color" by Joy Turner Luke; Fairchild Publications, New York, 1996; ISBN 1-56367-031-3. Munsell space roughly abides by the terms which describe a perceptual color space, though not precisely, as it is intended to meet requirements suitable for tasks other than the one described in this invention. Specifically, the Munsell Color System was designed to be used by artists during the image creation process to facilitate the selection of colors, whereas the intermediate color space (4) of the present invention has been specifically designed to be used by the application software (6) during the color image translation process. In order for the application software to accurately translate color images from one medium to another, the intermediate color space has been laid out such that two colors of equal chroma, of 12 steps, and value, on adjacent hue pages, will have a contrast step of one. As the chromas of the two colors approach zero, their color contrast also approaches zero in a linear manner. So, for example, if the two colors on adjacent hue pages both had chromas of 24, then the color contrast between them would be two. It is not important to setup the intermediate color space such that two colors on adjacent hue pages both with a chroma equal to 12 are separated by a color contrast of one step. The color space could be constructed so that this one step contrast difference existed at almost any chroma value. Further, the intermediate color space (4) is constructed such that the color contrasts between all adjacent colors on the same hue page are the same.

Before entering into a detailed discussion about the color image translation process, it is helpful to understand what is meant by the terms "image" and "color range" with respect to the intermediate color space (4) described earlier.

The term "image", in the context of the inventive color correction application software (6) describes an array of colors which exist within the intermediate color space, or an array of points whose positions within the intermediate color space are indicated by their positions on the intermediate color space axes. This array of colors is generally assumed to be arranged on a flat surface in any order or distribution. This flat surface could be a computer screen, monitor, or other light based console composed of horizontally and vertically arranged pixels, or units of color.

Figure 5:
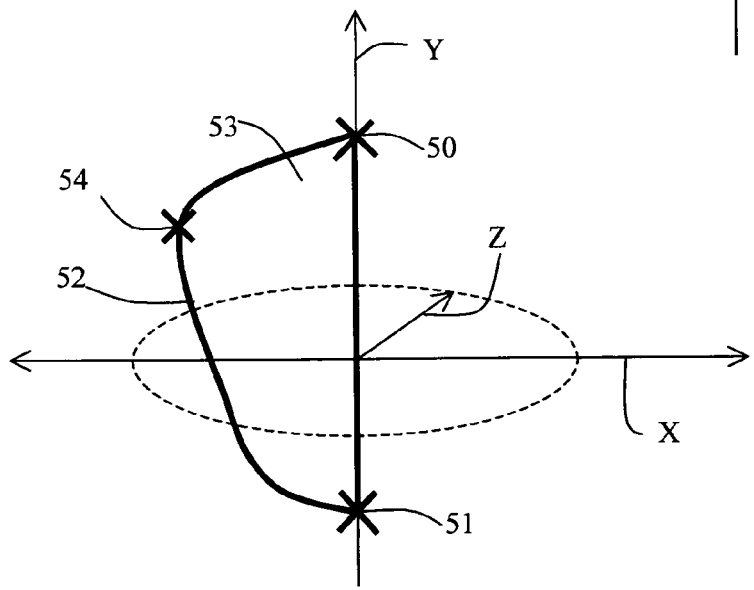
FIG. 5 illustrates a typical gamut for a display device.

The intermediate color space (4) is capable of containing all colors which can be perceived by human vision. Any medium, including but not limited to a computer monitor, film, paper and ink, will have a color range that is composed of a restricted volume of colors within the intermediate color space. In other words, a medium's color range consists of a limited volume of colors which is able to "fit inside" the intermediate color space. This finite set of colors available to the medium is often called the gamut for the medium or device. Such a gamut (53) is illustrated with reference to FIG. 5.

Although the typical color gamut of a medium would occupy a three dimensional space, the gamut (53) I have elected to describe here is a hue page and only occupies a two dimensional space. I am describing the gamut from this perspective for ease of description only and this description in no way limits the scope of my invention to two dimensional space. The gamut (53) is defined by the bold outline (52) and the range includes all colors lying within this space and on the outline (52). Generally, a gamut always has a maximum value (50) and a minimum value (51) characteristic, where no color in the gamut is higher than a maximum or lower than the minimum on the value axis (Y). It is assumed that the gamut (53) contains every value between the maximum and minimum which means that it contains at least one color for every value greater than the minimum and less than the maximum. Also, little is sacrificed by assuming that the gamut contains the neutral axis as every color along the gamut's value axis that has a chroma of 0, i.e., all neutral grays.

It is assumed that the gamut (53) contains all hues for every value on the Y axis, or the entire spectrum of the hue axis for each value in the gamut. This means that within the gamut, for every position on the hue axis and every position on the value axis there will be at least one color in the gamut, even if that color has a chroma equal to zero.

As mentioned above, a gamut for a medium generally exists in three dimensional color space. Generally, a medium's gamut can be thought of as an enclosed surface area confining a volume within a space, and the colors within the range occupy both the surface and the volume enclosed. Considering FIG. 5 this space could be defined by rotating the hue page boundary (52) around the Y axis by 360°, resulting in a three dimensional volume confined by a surface area. The chroma of the boundary (52) may continually change for every hue value as it is rotated around the Y axis, but the minimum value and maximum value of the gamut will not change. Consequently, it is convenient to represent a gamut by establishing a function which evaluates the maximum chroma level (54) capable of being displayed in the gamut given a specified value and hue. Thus each maximum chroma (54) within the gamut could be found by evaluating the function at every value and every hue that lies within the gamut, thus effectively mapping the surface area of the gamut in terms of maximum chroma points. I use the following equation to evaluate the maximum chroma at a given hue and value:

$$\text{maxChroma} = (\text{hue}, \text{value}) \qquad \text{Eq. 1.0}$$

The output of equation 1.0 is the maximum chroma at the given hue and value within a medium's gamut.

In order to practice my invention, it is necessary to be able to quantify color distances between any two colors within the intermediate color space (4). This color distance will be referred to as color contrast. A color contrast is defined to be the quantified magnitude of the visual quality of contrast that is generated when two colors touch each other. It can also be thought of as the quantified visual difference between the two touching colors, or the quantified strength of the border separating the two touching colors. As previously discussed, I have defined a unit of color contrast to be equivalent to one chroma step, which could be for instance the step (27a) of FIG. 2a. Steps, as a measurement of color distance, progress arithmetically, i.e., where one step is the unit step, ½ step is half the distance, two steps is twice the distance, and so on.

Color distance is evaluated in the intermediate color space (4) much as the distance between two points would be resolved in three-dimensional physical space. The distance between two colors is resolved by first evaluating the distances between the two color's hues, values and chromas respectively, and then evaluating the Pythagorean formula using those three distances. Equation 1.1 is used to evaluate color distances.

Total Color Distance=$\sqrt{[(hue\ distance)^2+(value\ distance)^2+(chroma\ distance)^2]}$ Equation 1.1

As previously discussed, the unit step, or the color distance that is equivalent to one step, is the distance between two colors that differ by one chroma increment. In other words, one color distance step is equivalent to one chroma step.

It is important to understand how the steps of the value axis (Y) and the hue axis (Z) relate to the steps of the chroma axis when evaluating color distance. As mentioned previously with reference to FIG. 3, under the distance notation of the intermediate color space (4), one step along the value axis (Y) is equivalent to eight chroma steps, thus one value step equals eight steps. When calculating the value distance and the chroma distance before executing the equation 1.1, the following two equations 1.12 and 1.13 are used, where value1 and chroma1 belong to a first color which is point (47*a*) located in the intermediate color space (4) of FIG. 4 and value2 and chroma2 belong to second color which is a point (47*b*) located in the color space (4) of FIG. 4.

value distance=(|value1−value2|)(8)  Eq.1.12 chroma distance=|chroma1−chroma2|  Eq.1.13

The hue axis relates to the chroma axis in a special way. First, because it is cyclical, the hue distance between two colors can only be as great as that created by two opposite hues, or two hues at opposing ends of the spectrum. Second, distance between hues is strengthened or diminished as the chroma of one or both the colors increases or decreases. But before chroma is considered in the total hue distance, there must be a means for evaluating the basic distance between hues independent of chroma.

As mentioned with reference to FIG. 2, the common convention is to divide the hue axis into 40 groups and it is convenient to assign the difference between each group to be one basic hue step, for example, the difference between R 2.5 and R 5. For the purpose of mathematically resolving the basic hue distance with some degree of nuance, it is convenient to assign numbers to each hue desired. For many practical purposes, a scale of 1000 hues is suitable, numbered 1 through 1000. This way, 100 hues are assigned to each of the 10 groups, where 1-100 are R 0.1-R 10.0, 101-200 are YR 0.1-YR 10.0, 201-300 are Y 0.1-Y 10.0, and so on. The number associated with a hue can be calculated, given a set of group numbers which correspond to the ten hue groups, for example R=0, YR=100, Y=200, GY=300, G=400, BG=500, B=600, PB=700, P=800, RP=900, and given the secondary number, for example 2.5, 5, 9.4, etc. Equation 1.14 is used to calculate the hue number.

hue number=(group number)+(secondary number) (10)  Eq.1.14

Using equation 1.15, the basic hue distance between colors can then be calculated by taking the difference between two hue numbers, and dividing by the hue number which reflects the difference between 2 adjacent hues in a 40 part spectrum (the difference between R 2.5 and R 5). The divisor is equivalent to the hue number for R 5 (50) minus the hue number for R 2.5 (25) which is 25 in this case.

basic hue distance=|hue number 1−hue number 2|/25  Eq. 1.15

However, since the hue axis is cyclical, the basic hue distance cannot exceed the distance between a hue and its opposite, e.g., between R 2.5 and BG 2.5. Any distance in excess of that distance should be smaller than the distance by the exact amount it exceeds the distance by. In the case of the opposite hues R 2.5 and BG 2.5, the basic hue distance is 20. Thus any distance which exceeds 20 should be subtracted from 40, the total distance around the spectrum, to arrive at the adjusted basic hue distance. Equation 1.16 is used to arrive at the adjusted basic hue distance.

adjusted basic hue distance=40−basic hue distance  Eq. 1.16

Once the adjusted basic hue distance is evaluated, the total hue distance must be evaluated based on the chroma positions of both colors, since the magnitudes of the chromas of both of the colors influence the magnitude of the total hue distance. To arrive at a formula for total hue distance, it is important to know the chroma position which both colors must have in order for the total hue distance to be equivalent to the adjusted basic hue distance. In many cases, and for the purposes of my invention, this chroma position is twelve. That is, when two colors both have a chroma of twelve, the total hue distance equals the adjusted basic hue distance. When both chroma positions remain the same, the total hue distance increases or decreases with the chroma arithmetically. That is, when the two chromas are 6, the hue distance is half the basic hue distance, and when the chromas are twelve, the hue distance is double. It should be understood, that I selected a chroma position of twelve as a convenience for constructing the intermediate color space (4) and that a higher or lower chroma position could have been selected whereby two colors having this chroma would result in the total hue distance equaling the adjusted basic hue distance. Equation 1.17 calculates the total hue distance between to colors having the same chromas.

total hue distance=(adjusted basic hue distance) (chroma/12)  Eq. 1.17

In order to calculate the total hue distance between two colors when the two chroma positions differ, it is necessary to determine what single chroma position is needed to evaluate the total hue difference. Logically, this is the average of the two chroma positions. However, it is true that there is no hue distance when one of the colors is gray, or has a chroma of zero, and that the hue distance diminishes arithmetically as one of the chromas progresses towards zero. This being the case, an average of the two chromas is insufficient, and must be modified by a factor represented by the ratio between the lower chroma and the higher chroma. In other words, the single chroma position at which the hue distance will be evaluated is equal to the average of the chromas multiplied by the lower chroma divided by the higher chroma. For such a case, equation 1.18 is used to calculate the adjusted chroma.

adjusted chroma=((lower chroma+higher chroma)/2) (lower chroma/higher chroma)  Eq. 1.19

Equation 1.18 is perfectly effective when the lower chroma equals the higher chroma. When both chromas equal zero, the adjusted chroma is zero. When the chromas of two colors are different, the adjusted chroma is used in place of the "chroma" term in equation 1.17 to evaluate the total hue distance. This gives us equation 1.19 below.

total hue distance=(adjusted basic hue distance)(adjusted chroma/12)  Eq. 1.11

Figure 6:
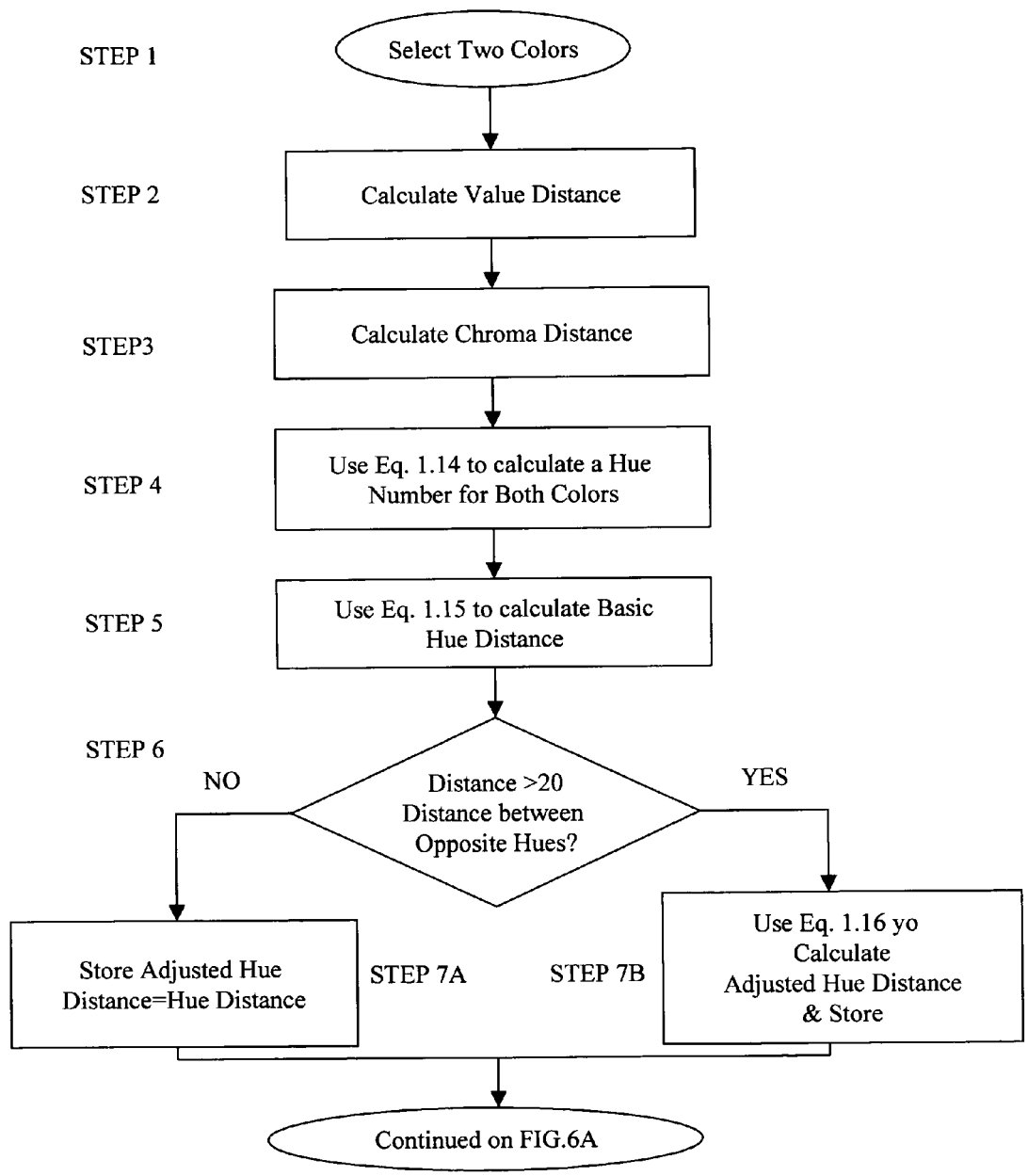
FIGS. 6 & 6a are a flow chart showing the process for calculating the contrast distance between two colors.
Figure 6A:
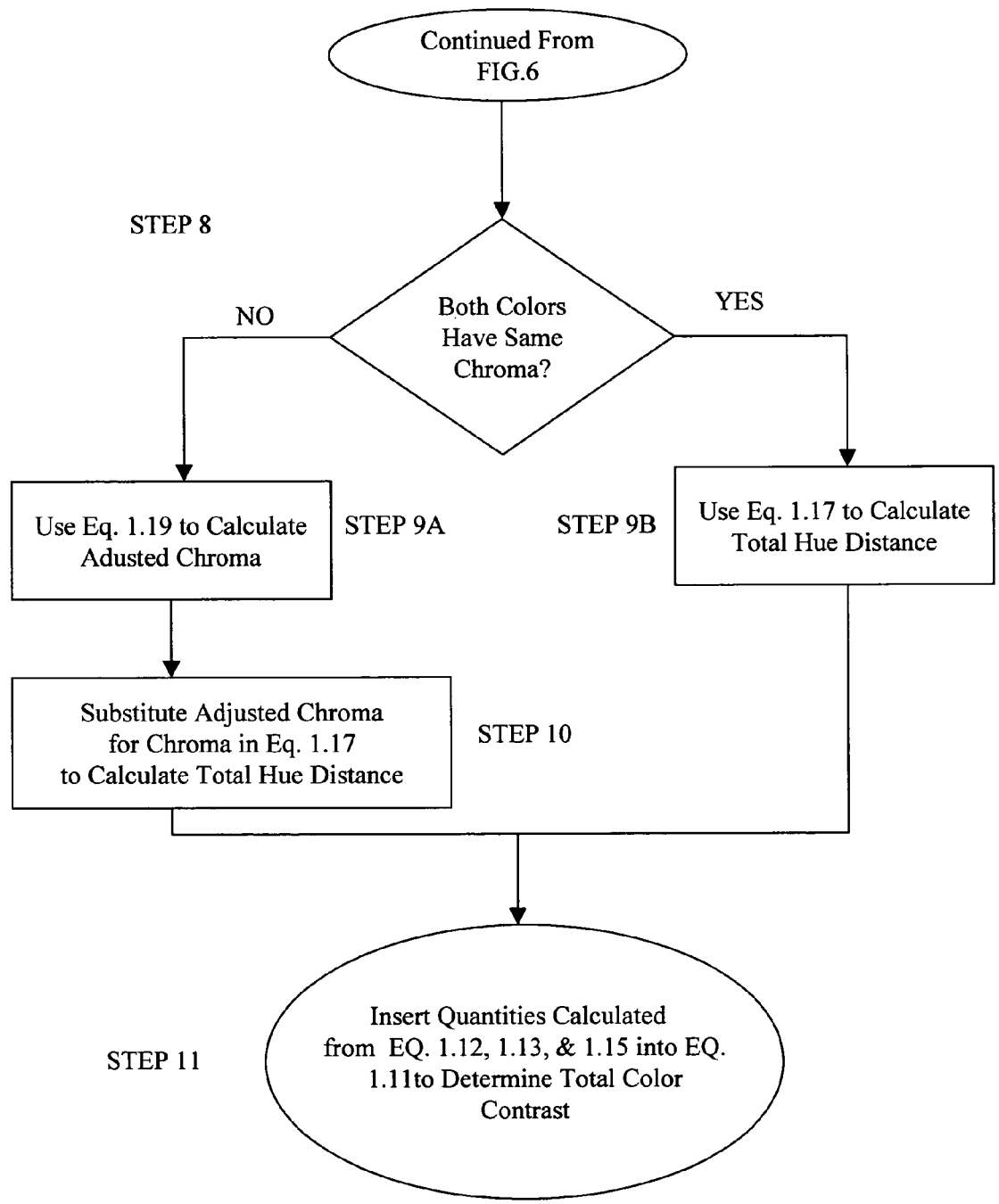

Referring to FIGS. 6 and 6*a*, it is possible to use Eq. 1.11 to calculate the contrast between two colors. In Step (1) of FIG. 6, two colors, A and B, are selected from an image located in the intermediate color space (4) of FIG. 1, that have respective values of 5 and 15, respective hues of R2.5 and YR2.5, and respective chromas of 6 and 13. Then, in Step (2), the color distance or contrast between these two colors is evaluated by first calculating the value distance between the two colors using Eq. 1.12.

Value distance=(|5−15|)(8)=80

Next, in Step (3), the chroma distance is calculated utilizing Eq. 1.13.

Chroma distance=|6−13|=7

Next, in Step (4), Eq. 1.14 is used to calculate a hue number for both color A and color B as follows.

Hue Number $A$=0+(2.5)(10)=25

Hue Number $B$=100+(2.5)(10)=125

Proceeding to Step (5), hue number for color A, which is 25, and the hue number for color B, which is 125, can be inserted into Eq. 1.15 as follows:

Basic Hue Distance=|25−125|/25=4

However, as discussed earlier, the basic hue distance can not be greater than twenty, so in Step (6), it is necessary to test the basic hue number to determine whether or not it is greater than twenty. As shown in Step (7a) and (7b), if the number is greater than twenty, Eq. 1.16 is used to calculate an adjusted hue distance, and if the basic hue number is not greater than twenty the hue distance is equal to the adjusted hue distance. This distance is then stored. In this example, the hue number between the two colors is four, so the hue distance equals the adjusted hue distance.

Proceeding to Step (8) in FIG. 6a, the two colors, A and B, are tested to determine whether or not they have the same chroma. If they do have the same chromas, then the process proceeds to Step (9b) and Eq. 1.17 is used to calculate the total hue distance, otherwise, the process proceeds to Step (9a) and Eq. 1.19 is used to calculate the adjusted chroma. In this case, both colors have different chromas so the process proceeds to Step (9a) and the adjusted chroma is calculated as follows:

Adjusted Chroma=((6+13)/2)(6/13)=(9.5)(0.46)=4.37

In Step (10), the adjusted chroma is substituted for the chroma value in Eq. 1.17 and the total hue distance is calculated as follows:

Total Hue Distance=(4)(4.37/12)=1.45

Finally, the total color contrast can be calculated using Eq. 1.11 as follows:

Total Color Contrast=$\sqrt{(1.45)^2(80)^2(7)^2}$=$\sqrt{(2.1)(6400)(49)}$=811.5

To facilitate the inventive color correction method implemented by the application software (6) described earlier with reference to FIG. 1, it is convenient, for some but not all images, to impose a certain organization on the array of colors which compose the image. This organization may consist of grouping the most similar colors within the image to a specified degree of similarity, and treating these groups as the individual colors which compose the image. For instance, it may be desirable to group colors if an image has a large number of colors and/or is some of the colors are very close together in terms of hue, value, and chroma. Such a grouping procedure will be described below with reference to FIG. 7. It should be understood that similar but varied procedures may be used which would be as effective and the invention is not limited to using the particular grouping method described here.

Figure 7:
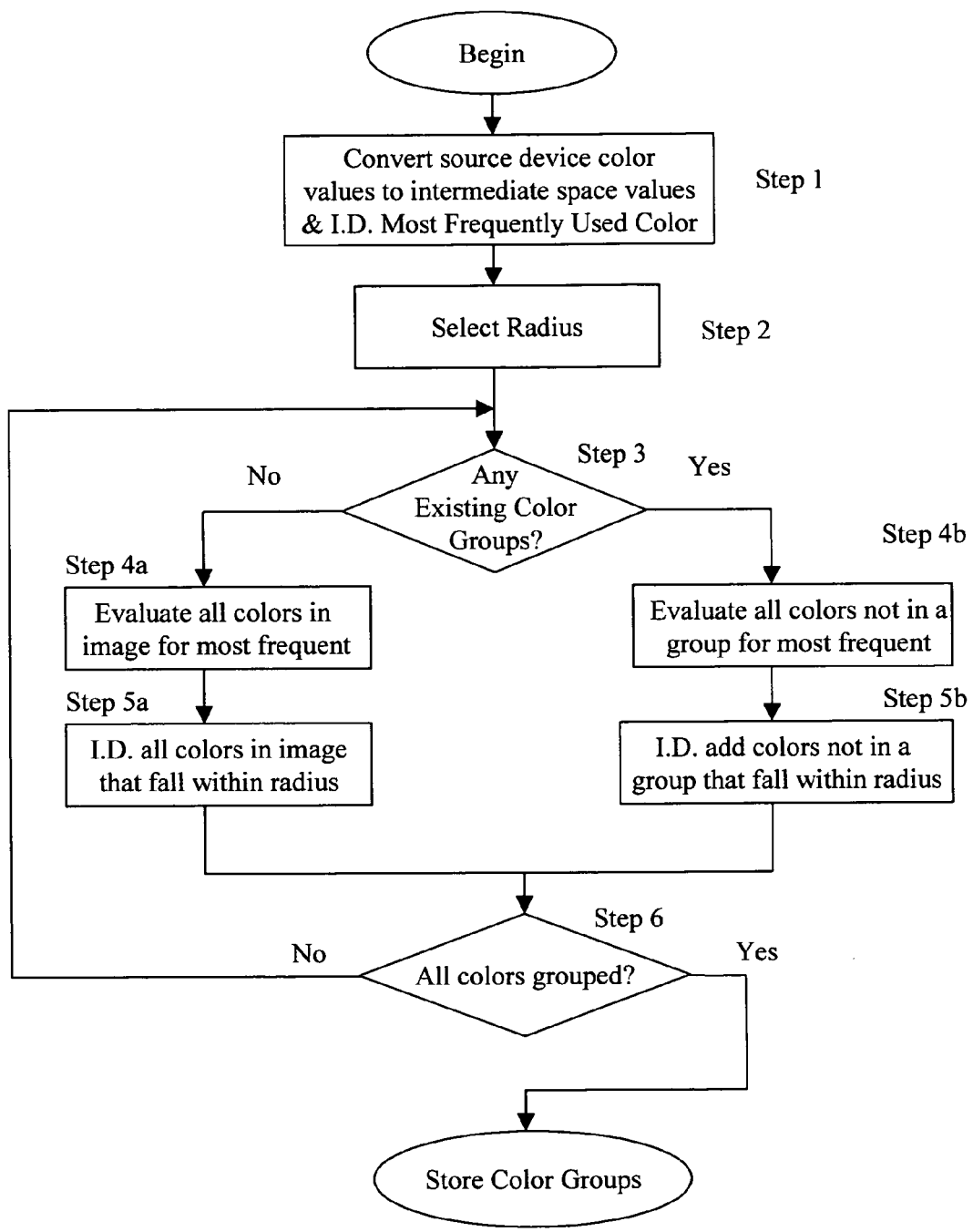
FIG. 7 is a flow chart showing the process used for grouping colors in a color image.

Beginning with Step (1) of FIG. 7, and prior to actually grouping colors, source device color values are converted to intermediate color space color values. This process was described with reference to FIG. 1 and so will not be described again here. Step (1) also consists of identifying the most frequently used color in the source medium image. Step (2) consists of selecting a distance, or pivot radius representing a contrast distance. The pivot radius is expressed in units of color distance steps and the selection process can be somewhat arbitrary but can be based on the distances between the colors in an image. In Step (3) the application software checks to see if there are any existing color groups, if not, then it proceeds to Step (4a), otherwise the application proceeds to Step (4b). At Step (4a) all of the colors in image contained in the intermediate color space are examined to identify the most frequently appearing color, or the color which occupies the most pixels within the image. In Step (5a) each of the remaining colors are analyzed to determine whether they are within a specified distance or radius of this color. Any color's distance from the initial color, as determined from Eq. 1.11, that is found to be less than or equal to the pivot radius is accepted into the first color group. Once each color has been checked for this condition, the application proceeds to Step (6) where it checks to see if all of the colors have been assigned to a group. If all colors have been grouped, then the results are stored. If not all colors have been grouped, then the application goes back to Step (3). At this point, assuming that there is at least one existing color group, the application proceeds to Step (4b) where the colors, not already grouped, are examined to determine which is the most frequent color. In Step (5b) all remaining colors are evaluated once again, placing all colors which meet the condition into the current color group. As illustrated by Step (6) this process is repeated until there are no colors within the image that do not belong to a color group.

Once determined, these color groups may contain from one to any quantity of colors, depending on the value specified for the pivot radius, i.e., they will contain one color with a pivot radius of zero, and likely more colors with a higher pivot radius.

After the image has been partitioned into color groups as described above, it is advantageous to quantify further qualities of the color groups. For instance, it may be advantageous to quantify the quality of "relevance" for each color group. The relevance of a color group is a measured magnitude of the group's importance with relative respect to other groups within the entire visual scheme of the image. It is a quality that is used for calculations associated with color translation accuracy which will be discussed in detail later in this application.

A color group's relevance is a composite of the total area it covers, in pixels, within the image and the color group's quality of "density". The specific relationship between a color group's relevance and these two qualities is displayed in equation 2.02 below.

$$\text{group's relevance} = \frac{(\text{group's area})(1 + (\text{group's density})(\text{density weight}))}{(\text{image's area})(1 + (\text{image's density})(\text{density weight}))} \quad \text{Eq. 2.02}$$

The "density weight" quality accounts for how greatly the group's density quality influences the group's relevance. The group's relevance is a ratio between the quality of the group expressed by the upper half, and the same quality of the whole image expressed by the lower half. This equation will naturally yield a number between zero and one inclusive, a greater number indicating a greater relevance.

A group's "area" quality is expressed by the following equation 2.03.

group's area=sum of all pixels representing colors in group     Eq. 2.03

A group's "density" quality indicates how tightly clustered together are all of the pixels which represent the colors in the group. In order to satisfy the needs of equation 2.02, it must be a number between zero and one inclusive. A convenient way of measuring density in such a way is to calculate the quantity of pairs of pixels which border each other within the group, divided by the number of bordering pairs which are possible for a group of that area. Two pixels are said to border each other if they are horizontally or vertically adjacent within the pixel grid. A group's "density" quality is expressed by the following equation 2.04.

group's density=pairs of bordering pixels/possible bordering pairs     Eq. 2.04

The number of bordering pixels is calculated by acquiring the sum of every pair of pixels in the color group which border each other. The number of possible bordering pairs for a group depends on the area of that group, which is equivalent to the number of bordering pairs within a square of pixels of that area. That quantity is expressed by the following equation 2.05.

possible bordering pairs=(2)(area)−(2)floor($\sqrt{\text{area}}$)     Eq. 2.05 note: floor indicates that the number is rounded down

The method of the inventive color correction application (6) involves translating an image that is composed of colors within the range of a source medium's color gamut to an image that is composed of colors within the range of a target medium's gamut. For the effect of my invention to become visually apparent, it should be assumed that the color ranges of the source and target gamuts are different. This difference equates to at least one color present in the source gamut not being present in the target gamut. But as a practical matter, as the differences between the two gamuts increase, the accuracy that my method provides becomes more apparent. In the preferred embodiment of my invention, the conditions for acceptability involve two factors. One factor is the translated image's colors' closeness, or level of visual similarity to the corresponding colors of the original source image. This factor of closeness is expressed as color distance in units of steps, which steps are calculated using equation 1.11 which was discussed previously. The second factor is the conservation of the original proportions among the distance between the colors of the original source image. In other words, the proportional relationships among the distances between all colors in the image must be kept close to those of the original where a proportion relationship between two distances is essentially a quantity needed to multiply one distance by to equal the other. For example, given two contrast distances, 4 and 12 steps, one is 3 times the other, thus 3 is that proportional quantity. More specifically, with reference to the colors (47a–e) of color range 46 in FIG. 4, If the color distances or contrasts between the color pairs (47a) and (47b), (47a) and (47c), (47a) and (47d), and (47a) and (47e) are one, two, three, and four units respectively, then the proportional relationship between the two pairs of colors (47a and b) and (47a and c) is 1::2, and the proportional relationship between the two pairs of colors (47a and b) and (47a and c) is 1::3, and so forth.

It is convenient to describe the accuracy of a translated image in the form of a scalar quantity, such that it is a measurable quality. Using a scalar quantity allows the user of this inventive application to measure the translation accuracy very precisely. Equation 3.11 expresses the basic format of the calculations utilized to determine a translated image's accuracy. It is intended to yield a number between zero and one inclusive.

accuracy=[(aggregate image closeness)($W$closeness)+ (proportion conservation)($W$prop)]/($W$closeness+ $W$prop)     Eq. 3.11

Both the terms "aggregate image closeness" and "proportion conservation" are intended to be numbers from zero to one inclusive. The closer the closeness term is to 1, the closer the colors of the translated image are to those of the original image. The closer the proportion conservation term is to 1, the closer the proportions among the distances of the translated image are to those of the original image. Consequently, the closer the total accuracy or the result of equation 3.11 is to 1, the closer the translated image is to being as accurate a translation as possible under the given circumstances. The terms "Wcloseness", which is a closeness weighting factor, and "Wprop", which is a proportion weighing factor, are intended to increase or diminish the influence either or both factors have over accuracy respectively. Both of these terms will be described in more detail below. The greater either of these weighting terms is, the greater the influence its corresponding factor, closeness or proportion, has in the equation 3.11.

The "aggregate image closeness" term, of equation 3.11, is represented by a special weighted average of all the colors' distances, after repositioning, from their original positions in the intermediate color space (4). Specifically, this average consists of the difference between each color's distance from its original position, which is the color's position after it is moved into the intermediate color space from a source medium, and the maximum distance from its original intermediate color space position possible within the target gamut, then divided by that same maximum. The elements of the average are weighted by each color's relevance characteristic, otherwise known as the group's relevance characteristic, within the scheme of the image as determined with equation 2.02. Equation 3.12 is used to calculate the aggregate image closeness term of equation 3.11.

aggregate image closeness=for every color $i$, the sum of: Line (1) [[(maxDistance $i$−distance $i$)/maxDistance $i$]($W$dist)+Line (2) [(relevance $i$) to the power of Line (3) ((distance $i$/maxDistance $i$) to the power of $n$)]($W$rel)]Line (4) (number of colors)($W$dist+$W$rel)     Eq. 3.12

Continuing to refer to Eq. 3.12, the term "maxDistance i" is the greatest distance from a color i located in the source gamut to a color located in the target gamut. This distance would be measured from the source gamut color value to some point on the perimeter of the target gamut that is the greatest distance from the source gamut color. Given two colors, a first color located in the source gamut and a second color located in the target gamut and given that the maxDistance=0, the "maxDistance i" term can be calculated by evaluating, for each color on the perimeter of the target gamut, the distance between the first and second colors, and if this distance is greater than maxDistance, or zero, then "maxDistance i" is equivalent to that distance between the first and second colors. The inventor contemplates that several other methods can be used to calculate the "maxDistance i" term, for instance, instead of searching the entire gamut perimeter, it is possible to limit the perimeter based on the source gamut color. So, if the source gamut color lies in the red quadrant, it would be possible to only search the perimeter of the green quadrant. Or, it is possible to limit the perimeter strictly to the source gamut colors complement color, so only a line is being searched instead of the entire perimeter of the target gamut. The term "distance i" is the distance color i in the source gamut is from color i after the image has been translated into the target gamut. The term "relevance i" is the relevance of color i as derived from equation 2.02. This term weights the elements of the average, those colors having higher relevance having higher impact on the average. The relevance i term is raised to a power specified by the fraction of distance i and "maxDistance i". This is to ensure that the relevance aspect equals one when there is no distance between the color and its original position. This fraction itself is raised to a power specified by the term "n", which if less than one, ensures that the relevance aspect is closer to equaling relevance i when the fraction is not equal to zero. The terms "Wdist" and "Wrel" are weights to the distance aspect and the relevance aspect respectively in the equation. The higher either one is, the greater the role either aspect plays over the other in the total average. Line (1) in equation 3.12 represents the distance aspect and lines (2) and (3) represent the relevance aspect. The term "number of colors", in line (4) is the total quantity of colors in the image.

In equation 3.11, the term "proportion conservation" is a special weighted average of how greatly the proportions among all the distances differ from those in the original source image gamut. Specifically, the average consists of the fraction each proportion is of its original value before the translation, with each proportion weighted by its specific relevance within the image's scheme. Equation 3.13 is used to calculate the proportion conservation term.

proportion conservation=for each proportion i
    between two distances in the image, the sum of:
    [[(prop1*i*–|prop1*i*–prop2*i*|)/prop1*i*]($W$prop)+propRelevance *i* to the power of (((|prop1*i*–prop2*i*|/prop1*i*) to the power of *n*) ($W$prel)](number of proportions)($W$prop+$W$prel)    Eq. 3.13

The term "prop1 i" is the i-th proportion in the sum, representing a proportion in the original image in the source gamut. The term "prop2 i" is the i-th proportion in the sum as well, but represents the proportion after the image is translated to the target medium gamut. The term "propRelevance" is not the same as the relevance characteristic described by equation 2.02. It is a special quality of relevance which applies to proportions and may be zero through one inclusive and will be explained in more detail below. The "propRelevance i" term is raised to a power specified by the fraction of the difference between the original and new values for the proportion and the original proportion. This is to ensure that the propRelevance aspect equals one when there is no difference between the original and new proportions. This fraction itself is raised to a power specified by the term "n", which if less than one, ensures that the propRelevance aspect is closer to equaling relevance i when the fraction is not equal to zero. The terms "Wprop" and "Wprel" are weights to the proportion aspect and the propRelevance aspect respectively in the equation. The higher either one is, the greater the role either aspect plays over the other in the total average. The term "number of proportions" is the total number of proportions among color distances in the image.

The propRelevance characteristic for a proportion is calculated based on five conditions under which that proportion exists. The scope of my invention should not be limited to the use of greater or fewer propRelevance characteristics, I have elected to use the five characteristics described below as they are most relevant for this embodiment of my invention. The five propRelevance characteristics I use are the proportion's basic relevance, border length, solidity, proximity and prominence. Each characteristic quantifies a specific set of conditions under which a proportion exists, and each is a quantity between zero and one inclusive. Equation 3.14 expresses a proportion's propRelevance characteristic based on these five properties. There are many other ways of expressing the propRelevance relationship to suit certain needs that are perfectly effective, and equation 3.14 merely discloses my preferred embodiment.

$$propRelevance = [(\text{basic relevance})(Wbr) + \\ (\text{border length})(Wbl) + (\text{solidity})(Wsol) + \\ (\text{proximity})(Wprox) + (\text{prominence})(Wprom)] / \\ (Wbr + Wbl + Wsol + Wprox + Wprom)$$

Eq. 3.14

Equation 3.14 consists of a simple weighted average of each characteristic of the proportion being calculated. The terms "Wbr", "Wbl", "Wsol", "Wprox" and "Wprom" are weights which strengthen or diminish their corresponding characteristics' importance in the total average.

The "basic relevance" term of equation 3.14 is the characteristic that reflects the relevance of the colors involved in the proportion. Specifically it is an average of the relevance of the two distances involved with the proportion where the terms "dist relevance 1" and "dist relevance 2" are the relevance quantities of the two distances comprising the proportion. Equation 3.15 is used to calculate basic relevance.

$$\text{basic relevance}=(\text{dist relevance 1}+\text{dist relevance 2})/2 \qquad \text{Eq. 3.15}$$

The term "distance relevance" in equation 3.15 is another simple average of the relevance quantities of the two colors which comprise the distance and this term is evaluated according to equation 3.16. The "relevance of color" term in equation 3.16 corresponds to the relative number of pixels in an image that represent a particular color. Relevance of color can be expressed as a fraction. So if there were 3000 total pixels in an image and 100 of these pixels were green, green represents one thirtieth of the pixels in an image.

$$\text{dist relevance}=(\text{relevance of color1}+\text{relevance of color2})/2 \qquad \text{Eq. 3.16}$$

The term "border length" of equation 3.14 is the characteristic which expresses the total length of the border in some unit of measurement, for example 1 pixel width, which separates all colors involved in the proportion, then divided by some common maximum length to achieve the fraction necessary for the equation. Equation 3.17 is used to calculate the border length term.

$$\text{border length} = \frac{\text{total measurement of length of borders involved with the proportion}}{\text{maximum border measurement}} \quad \text{Eq. 3.17}$$

Methods for measuring color borders in units of pixel widths are well known in the art and any existing method could be used for equation 3.17. If there are no borders between any of the colors involved in the proportion, i.e. none of the colors touch each other, then the proportion's border length is zero. The term "maximum border measurement" is set by the user to be an appropriately sized measurement to make the fraction useful to the propRelevance equation (3.14). Note that even though a proportion's border length may be equal to zero, i.e., consisting of non-touching colors, the proportion's propRelevance characteristic may still be a significant value (greater than zero) due to other characteristics of the proportion. Normally within an image, the color distances found, and consequently the proportions thereof, are useful only with respect to colors which are touching and therefore generate contrast. However, for the purposes of assessing the relevance of a proportion in order to assess overall accuracy, it is appropriate to measure non-touching colors as well, since these relationships also contribute to the character of the image and should be preserved. Proportions consisting of non-touching colors will be inherently less relevant since their border length quantities will be zero.

The term "solidity" in equation 3.14 is a characteristic which expresses how sharp or how hazy the border is between the bordering colors which comprise the proportion. A high solidity will indicate sharper borders, or borders which separate two colors using very few intermediate colors. A low solidity will indicate duller or softer borders, those which separate two colors using many intermediate colors, creating more of a continuum or gradation effect. The solidity for a proportion is found by evaluating the average of the solidity quantities for lines drawn through the colors involved which are perpendicular to the borders separating them. These lines are evaluated at each increment along the borders of a specified length. They are evaluated by counting the increments of intermediate colors emanating from the border. Those increments closer to the border are giver greater weight in the calculation as they contribute more to the softness or haziness of the border. Naturally, proportions which feature no bordering colors have a solidity of zero, just as is with the case of border length. The process for evaluating the solidity of a proportion will be discussed below with reference to FIG. 8.

The following description assumes that border pixels between two colors and the border length have been identified. The process for calculating solidity begins, in Step (1) of FIG. 8 when the application (6) selects a starting point on the border between two colors. In Step (2), the application draws a line, perpendicular to the border at the selected point, from the selected border point through one or the other of the two colors. The color through which this line is draw first can be a default selection made by the application or a selection made by a user. In the event that either the application or the user elects to draw a line through the first color, the process continues to Step (3a) where the application identifies the local center point of the first color for the current point "P" on the border between the two colors. The local center relating to any point P on the color boundary is found by making a line perpendicular to the border at that point, cutting through the color, ending when it touches the border again. The midpoint of that line is the local center for P. Continuing to Step (4) of the process, the application selects a point lying between the local center and point P, on the boundary, and evaluates the selected point on the line to determine if it represents a new intermediate color between the first color and the second color. A new intermediate color is one that is visually between the previous intermediate color, which in this case would be the local center, and the second color on the other side of boundary. If this selected point is a new intermediate color, the process proceeds to Step (5) and the distance, in pixtels between the local center and the selected point is added to a sum termed "Pixelsum" which has been initialized to zero prior to Step (1) and stored and the process proceeds to Step (6). If, however, the selected point is not a new intermediate color, then the process proceeds directly to Step (6). At Step (6) of the process, the application checks to see if all of the pixels in the line have been examined to determine if they are intermediate colors, and if all pixels have been examined, the process proceeds to Step (7) where the fraction, composed of the last calculated pixelsum divided by a specified maximum value, is added to the sum termed "current bordersum" and the process proceeds to Step (8). However, if all the pixels have not been examined, then the process loops back to Step (4). In Step (8), the application checks to see if pixels on lines drawn on both sides of the boundary between the two colors have been evaluated. If the intermediate color evaluation process has been conducted for pixels on both sides on the boundary, then the process proceeds to Step (9), otherwise, the process loops back to Step (2). At Step (9), the application checks to see if every point on the current boundary between the two colors has been evaluated. If not, the process moves to Step (10) and the specified function Borderinc is used to incrementally move, by at least one pixel, along the boundary in a specified direction and the incnum function is used to increment a count by one. If, on the other hand, every point on the current border has been evaluated, then the process moves to Step (11) in FIG. 8a where the current bordersum stored at Step (7) is added to by the function "total bordersum". The solidity is then calculated in Step (12) using equation 3.18.

$$\text{Solidity} = \text{borderum}/\text{incnum} \quad \text{Eq. 3.18}$$

The total bordersum quantity calculated in Step (11) is inserted for the bordersum term of equation 3.18 and the incnum quantity maintained at Step (10) is inserted for the incnum term of equation 3.18. The results of the solidity calculation are stored in Step (13).

The "proximity" term of equation 3.14 is a quantity which represents the physical distance, as opposed to the contrast distance, between the colors involved with a proportion within the scheme of an image's two-dimensional layout. The distances are measured from each mass of a color's physical center point which is established by averaging the location of all the pixel locations in the color's mass. A simple average of the physical distances between each color comprising the proportion is calculated in some unit of measurement, for example pixel widths, and then divided by a specified maximum physical distance to generate an appropriate fraction for use in equation 3.14. This fraction is subtracted from 1 to achieve higher numbers for closer colors, and lower numbers for further colors. Equation 3.19 is used to calculate a proximity relationship between two colors.

$$\text{proximity} = 1 - (\text{average of distances between center points of colors in the proportion})/(\text{maximum physical distance}) \quad \text{Eq. 3.19}$$

The "prominence" term of equation 3.14 is a quantity which represents the aggregate amount of color area which backs up or reinforces the borders that the colors generate within the proportion. Bordering colors within the proportion will have greater prominence if generally along points of the border, the colors on both sides extend well beyond the border along a line perpendicular to the border at those points. Bordering colors will have lesser prominence if along points of the border, the colors on either side are shallow to the border, or less color appears along the line perpendicular to the border at those points. Naturally, the prominence will equal zero when there are no bordering colors involved with the proportion.

Figure 8:
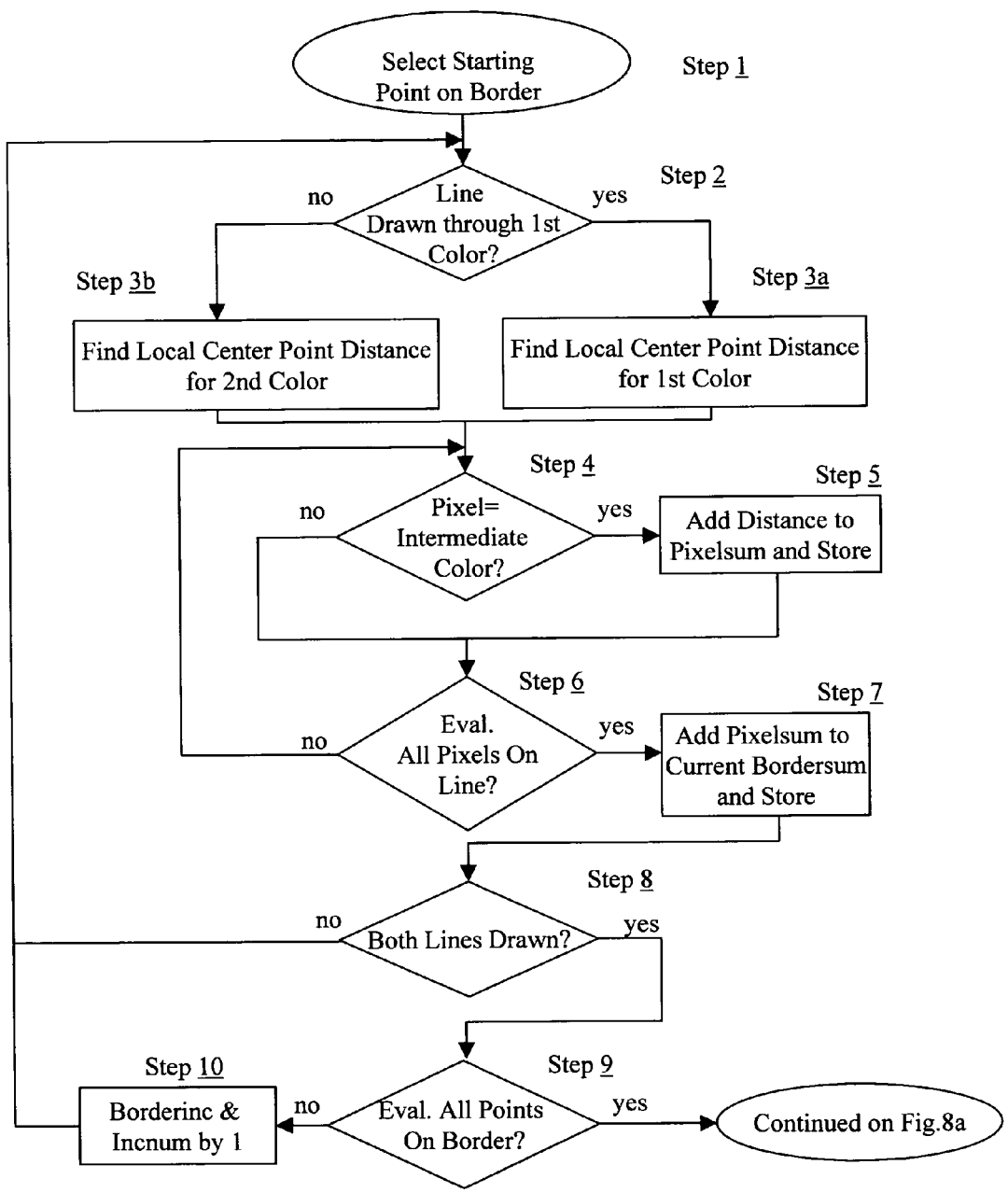
FIGS. 8 & 8a are a flow chart showing the process for evaluating the solidity of a proportion.
Figure 8A:
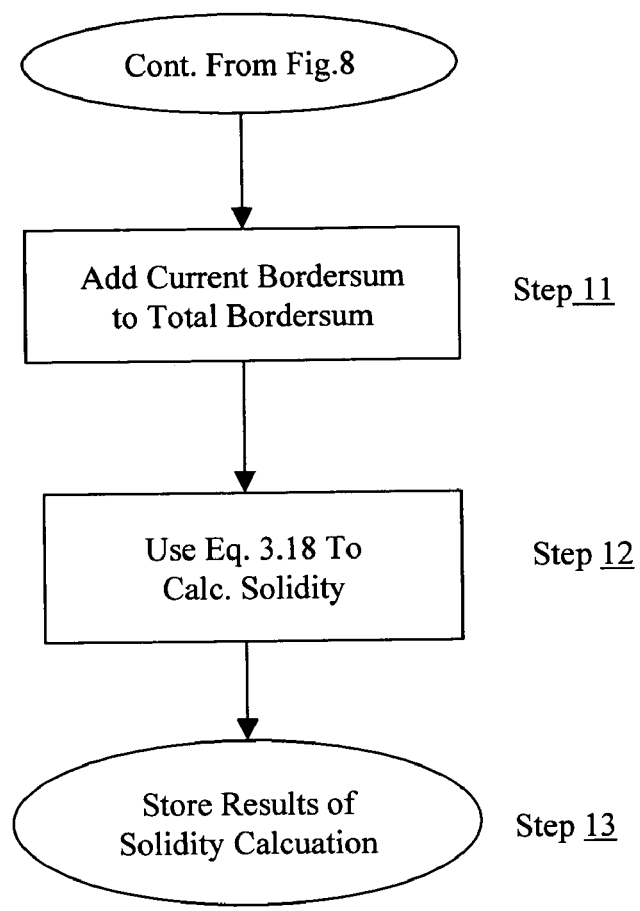
Figure 9:
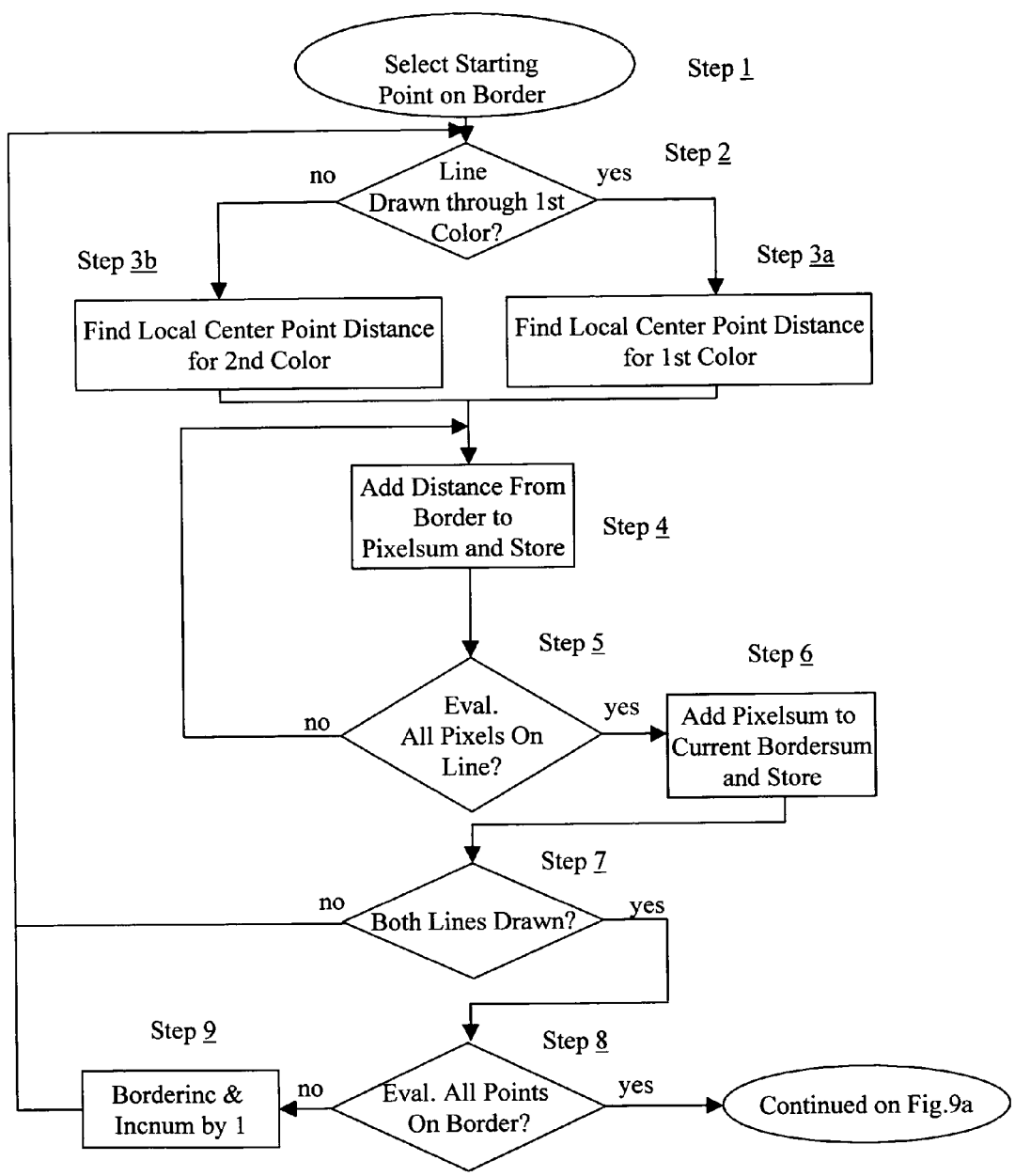
FIGS. 9 & 9a are a flow chart showing the process for calculating the prominence of a color.
Figure 9A:
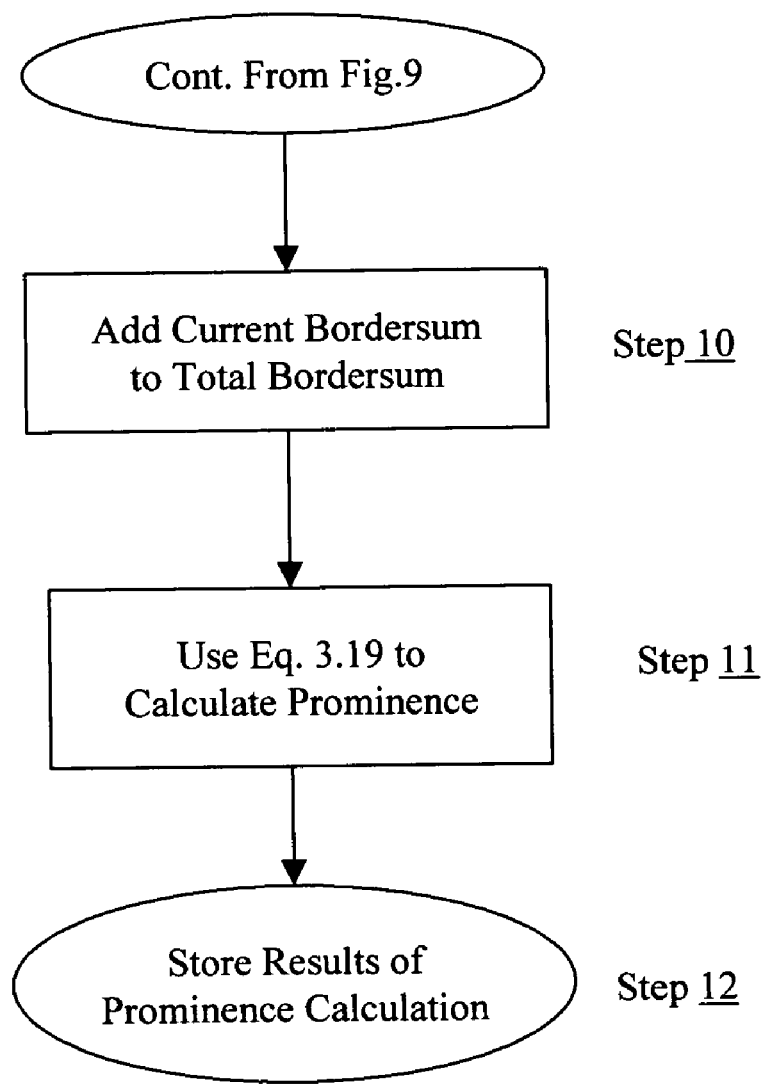

The process of calculating a proportion's prominence is very similar to that of calculating its solidity as with reference to FIGS. 8 and 8a above. The one difference is the elimination of step (5) which examines the pixels lying on the line perpendicular to the border to determine if the pixel is a new intermediate color. Regardless, each pixel is included in the pixelsum. In addition, the pixels which are further from the border have greater weight in the sum as opposed to those closer to the border. The process by which the application evaluates colors for prominence is described below with reference to FIGS. 9 and 9a.

The following description assumes that border pixels between two colors and the border length have been identified. The process for calculating prominence begins, in Step (1) of FIG. 9 when the application (6) selects a starting point on the border between two colors. In Step (2), the application draws a line, perpendicular to the border at the selected point, from the selected border point through one or the other of the two colors. The color through which this line is draw first can be a default selection made by the application or a selection made by a user. In the event that either the application or the user elects to draw a line through the first color, the process continues to Step (3a) where the application identifies the local center point of the first color for the current point "P" on the border between the two colors. The local center relating to any point P on the color boundary is found by making a line perpendicular to the border at that point, cutting through the color, ending when it touches the border again. The midpoint of that line is the local center for P. In Step (4), the distance, in pixtels, between the border and a point on the line between the border and the local center is added to a sum termed "Pixelsum", which has been initialized to zero prior to Step (1), and stored and the process proceeds to Step (5). At Step (5) of the process, the application checks to see if all of the pixels in the line have been examined to determine if they are intermediate colors, and if all pixels have been examined, the process proceeds to Step (6) where the fraction, composed of the last calculated pixelsum divided by a specified maximum value, is added to the sum termed "current bordersum" and the process proceeds to Step (7). Continuing to refer to Step (6), if all the pixels have not been examined, then the process loops back to Step (4). In Step (7), the application checks to see if pixels on lines drawn on both sides of the boundary between the two colors have been evaluated to determine their distance from the border point. If the distance evaluation process has been conducted for pixels on both sides on the boundary, then the process proceeds to Step (8), otherwise, the process loops back to Step (2). At Step (8), the application checks to see if every point on the current boundary between the two colors has been evaluated. If not, the process moves to Step (9) and the specified function Borderinc is used to incrementally move, by at least one pixel, along the boundary in a specified direction and the incnum function is used to increment a count by 1. If, on the other hand, every point on the current border has been evaluated, then the process moves to Step (10) in FIG. 8a where the current bordersum stored at Step (6) is added to by the function "total bordersum". The prominence is then calculated in Step (12) by dividing the bordersum quantity stored in Step (10) by the incnum value in Step (9).

Now having described in detail how calculate all of the terms of equation 3.11, it is possible for someone skilled in the art to calculate the accuracy with which an images colors have been translated from a source medium to a target medium in terms of a scalar quantity.

Note that all of the previously described processes that are performed by the application (6) in order to calculate an image translation accuracy quantity have been described with reference to individual colors. However, it should be understood that it may be preferable to make these same calculations using an image's color groups, as described with reference to FIG. 7, rather than its individual colors. The color groups may be treated identically to masses of color, using the central color for each group to represent that group.

Figure 10:
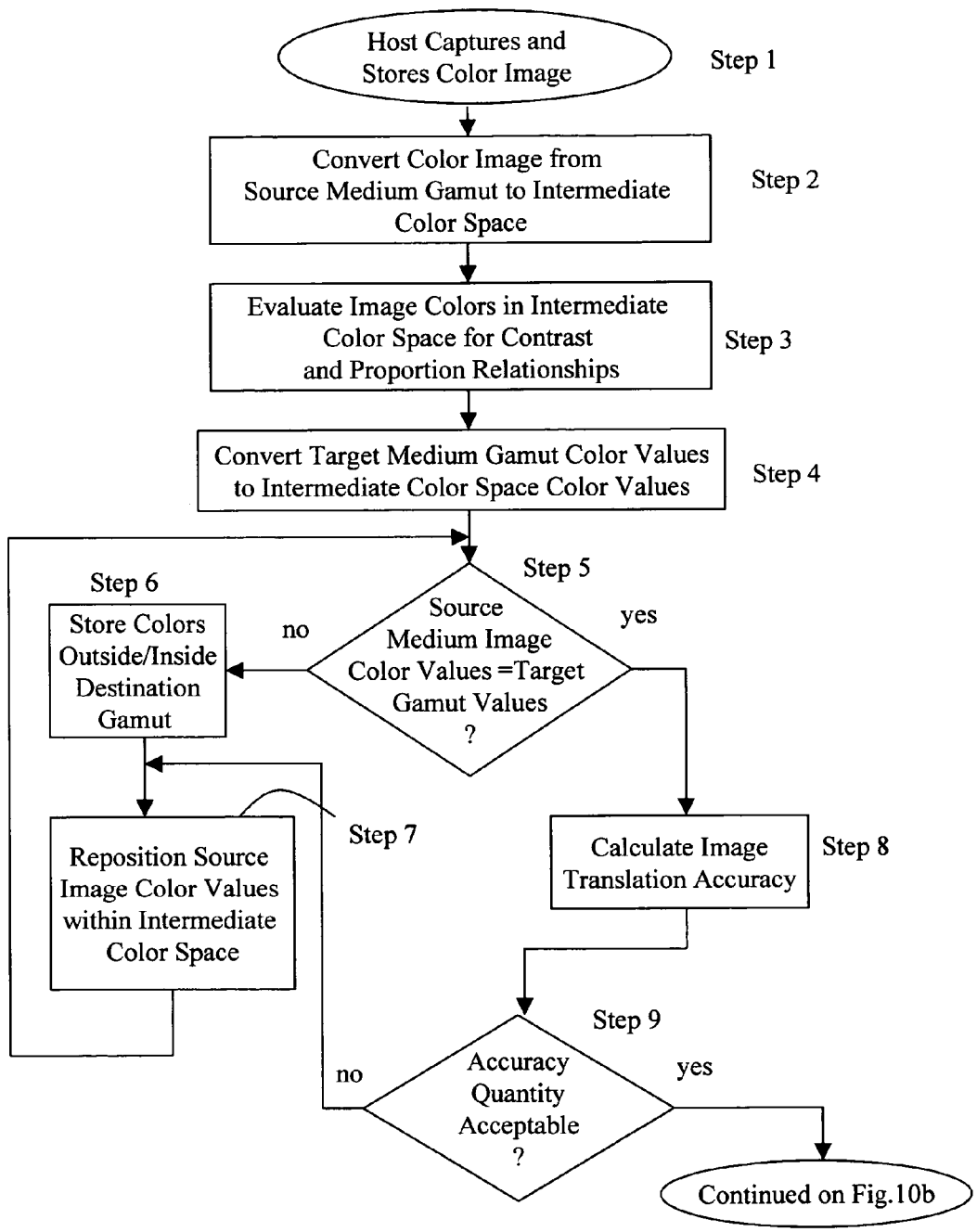
FIGS. 10 & 10a are a flow chart showing the color correction process of the invention.
Figure 10A:
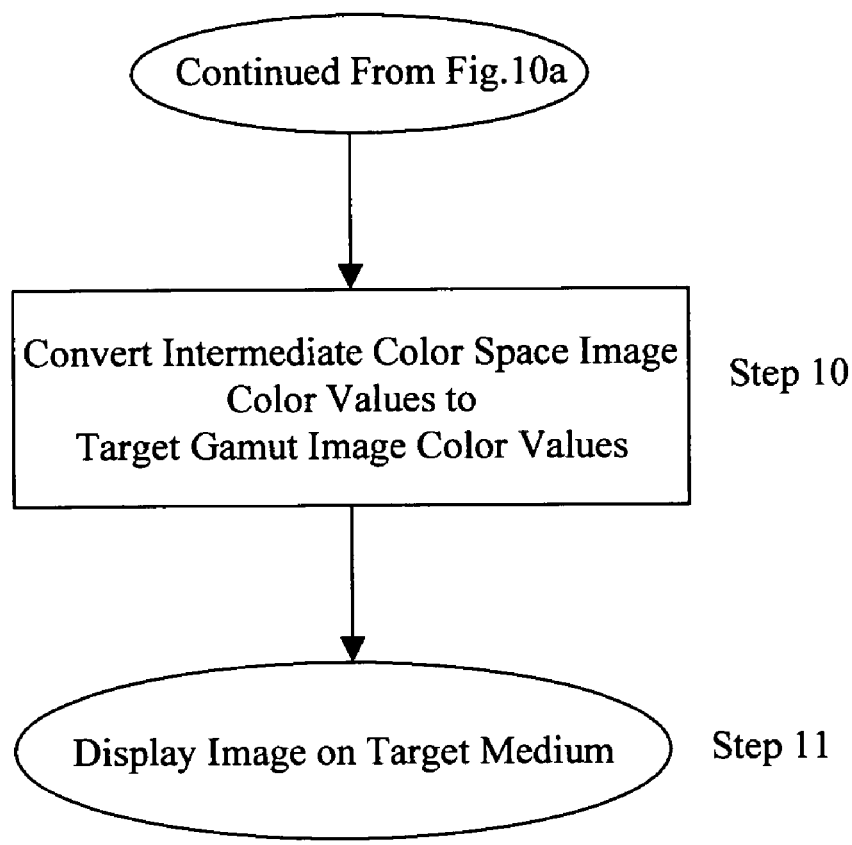

In view of the forgoing description, I will now describe my inventive color correction process with reference to FIGS. 10 and 10a. In Step (1), using any commercially available graphical image capture and editing application, the host system captures and stores a color image to the disk subsystem (12) or the memory subsystem (13) of FIG. 1. This permits the graphical application to access the image in order to make any necessary edits. In Step (2), the application (6), described with reference to FIG. 1, selects the appropriate table (5) to convert the source medium image color values to intermediate space (4) image color values. This conversion process is well understood by those who are skill in this art and although the contents of any particular table may be different, the methods used to create and use the conversion tables is well known and so will not be described here in detail. These intermediate space image color values are then stored in memory (13) of FIG. 1. Continuing to refer to FIG. 10, in Step (3) the application (6) calculates contrast and proportion relationships between a plurality of the colors in the intermediate color space and stores these quantities in memory (13).

Continuing to refer to FIG. 10, after completing the contrast and proportion calculations mentioned above, the application (6) proceeds to Step (4) of the translation process where it checks to see what the target medium gamut is. The application selects a conversion table from one of the conversion tables (5) depending upon the target medium gamut and converts the target medium gamut color values to the intermediate color space color values and stores these values in memory (13) of FIG. 1. This conversion process is also well know to those skilled in the art and so will not be described here in any detail.

At this point the translation process moves to Step (5) in FIG. 10 where the application (6) compares all of the original source medium image color values, stored in memory (13), to the target medium gamut values also stored in memory (13) in terms of the intermediate color space values. If this comparison results in all of the original image color values matching up with color values in the target medium's gamut, then the process proceeds to Step (8), otherwise, the process proceeds to Step (6). At this point, the application (6) can create two lists, a first list containing all those original source medium image color values that lay outside the target medium gamut and a second list containing all those original source medium image color values that lay inside the target medium gamut. The colors contained in both lists can exist in any format that describes their hue, value, and chroma. Also, it should be understood that it is not necessary to create these lists, but rather a color palette or a three dimensional color space representation could be used to illustrate which of the original source image colors were inside and outside the target medium gamut.

Continuing to refer to FIG. 10, in Step (7), the user of the application (6) would utilize the information stored at Step (6) to select a strategy to reposition the values of a plurality of the source image colors within the intermediate color space. The strategy selected depends in large part upon which one or the other or both of the translation accuracy factors, described with reference to equation 3.11, are deemed important. More specifically with regard to this repositioning of color values, and according to the preferred embodiment of my invention, if the user determined that it was more desirable to preserve color proportion than aggregate image closeness, then the user could shift all of the color values of the original source image along the value axis by the same amount to bring as many of the original source image color values into the gamut of the target medium as possible. The amount of the shift along the value axis should be minimized so that the number of the original source image colors repositioned to be inside the target medium gamut are maximized, while at the same time minimizing the deviation to the source image's minValue and maxValue. The shift operation by itself may not bring all of the source image colors into the target gamut and so it may be necessary to compress all or a plurality of the original source image color values so that all or substantially all of the source image colors are contained within the target gamut. The term "substantially all" is used in the context of my invention to mean that the user can employ the translation accuracy calculation method of the invention to determine whether or not it is desirable or necessary to bring all of the source image colors into the target gamut. In other words, if the translation accuracy criteria set by the user can be met without bringing all of the colors from the source image into the target gamut, then for the purposes of this invention substantially all of the source image colors are contained within the target gamut. This compression is accomplished by employing gamut clipping techniques or scaling techniques. Both gamut clipping and scaling are well known techniques to those familiar with color translation technology and so will not be described here in detail other than to say that gamut clipping only affects out of gamut colors and is employed to bring out of gamut colors into a gamut, whereas scaling would affect all of the colors in an image by the same proportionate amount and is used to bring some or all of the colors into the gamut.

With continued reference to Step (7) of FIG. 10, in the event that it was more important that the aggregate image closeness was preserved than proportion conservation, then the repositioning process might not consist of the shifting operation mentioned above, but rather the gamut clipping or scaling operations also mentioned above could be used. In the final analysis, it may not be desirable from the standpoint of translation accuracy to reposition all of the source gamut colors to be contained within the target gamut. If one, not very prominent color, is positioned far from the target gamut, but most or all of the other colors are not far, the strategy of simply dropping this one color may be the best course of action to follow, in which case substantially all of the source image colors can be considered to have been repositioned to be contained within the target gamut.

After the repositioning procedure of Step (7) has been completed, the application (6) would again make the comparison described earlier with reference to Step (5). This Step (5), (6), (7) loop would continue until all of the original source image color value were brought into the gamut of the target medium, or the user determines that a sufficient number of the colors have been brought into the gamut of the target medium.

The new color gamut resulting from the repositioning process described above with reference to Step (7) is termed the "working gamut" and it resides in the intermediate color space (4). Once the working gamut is determined, the relative positions of each color once contained in the original source medium gamut are carried over to corresponding compressed and shifted points within the working gamut. Thus the original source image is translated into the target medium gamut, or the new medium, since the working gamut lies fully within or is contained by the target gamut. Executing this process will not distort or alter the proportions within the image in any way, since every color is shifted in the same way, and the compression is consistent on every axis of the intermediate color space (4). Additionally, this process inherently accounts for minimal change in positions of the image's colors.

Continuing to refer to FIG. 10, in Step (8) equation 3.11 would be used to determine the effect the repositioning procedure has on color accuracy. More specifically, with respect to the preferred embodiment of my invention, the user would set the Wprop term to be greater than the Wcloseness term in order to increase the influence that the proportional color relationships have on the accuracy of the color translation process. In other words, any repositioning procedure undertaken by the user that adversely affects the proportional relationships of the colors would result in a lower accuracy quantity as calculated using equation 3.11. In Step (9), the application or the user compares the calculated accuracy quantity to an acceptable accuracy and if the calculated accuracy is acceptable, the process proceeds to Step(10) in FIG.10a, otherwise, the process proceeds back to Step (7) and the user proceeds to reposition the source image colors some more. In order for the repositioned colors to be displayed by the target medium, it is necessary to convert the new color values contained in the intermediate color space to target medium gamut image color values as shown in Step (10). These values are then stored and possibly sent to the target medium where they can be displayed.

In addition to facilitating the very accurately translation of color images, the preferred embodiment of my invention has another beneficial result, that is, it will translate every possible image that can exist in one medium over to another medium in precisely the same way. More specifically, if the conditions are kept constant, any group of colors composing an image will be shifted through the intermediate color space in the same way and compressed in the same way, assuming both the source and target mediums are kept the same between trials. Therefore, this process can be thought of as being "image-independent", meaning the specific colors of the image have no bearing on the process for translation. It is only the color ranges of the mediums which have a bearing on the translation process.

The above described preferred embodiment is useful in circumstances where many images may be translated to another medium at once, since each image will be translated in a consistent fashion with respect to each other. It is also a convenient process to employ if one expects to translate the image back to the original medium after some minor modification, since the result will be virtually free from defects or distortions.

In another embodiment of my invention, all of the Steps of the translation process are the same up to Step (7) at which point the user could perform the repositioning procedure described in Step (7) of FIG. 10 with the intent of preserving the aggregate color closeness of the original source image. In other words, the user determines that preservation of the original source image color values is more important that the preservation of the original proportional relationships between the colors. However, where the previously described repositioning procedure was quite stringent about being certain that all of the colors in the original source medium image are perfectly contained within the target medium's gamut after the repositioning procedure, this embodiment of my invention allows for some colors to remain outside the target medium's gamut after the compression portion of the repositioning procedure has been completed, thus potentially excluding colors in the original image from the translation process. Due to changing the focus of the translation process from one of proportion preservation to color closeness preservation, there will generally be less compression of the colors in the original image therefore conserving aggregate image closeness to a much greater degree. There are a number of factors which determine the acceptable number of original colors falling outside the target gamut after the compression process is complete. These factors are dependent upon image characteristics such as prominence, solidity, and proximity and are identified by someone experienced with the color image translation process.

The forgoing description of the embodiments of my invention are not intended to limit the scope of my invention, but serves only to illustrate a few of the methods which could be used to accurately translate a color image from one medium to another medium.

I claim:

1. A method for calculating the color image translation accuracy of a color image translated from a source device gamut to a target device gamut comprising the steps of:
    converting all source image color values to intermediate color space color values and storing these converted image color values as a first set of color values;
    selecting a first, a second and a third color value from the stored first set of color values and storing these color values;
    calculating a first color contrast value between the selected first and second color values and storing the first calculated color contrast value;
    calculating a second color contrast value between the selected first and third color values and storing the second calculated color contrast value;
    employing the first and second calculated color contrast values to establish a proportional color contrast relationship between the first and second and the first and third selected color values and storing the proportional color contrast relationship;
    converting all target device gamut color values to intermediate color space color values and storing these converted target device gamut color values as a second set of color values;
    comparing the first set of stored color values to the second set of stored color values;
    repositioning within the intermediate color space one or more of the color values in the first set of stored image color values so that a plurality of the color values in the first set correspond to color values in the second set of stored color values and storing these repositioned color values as a third set of color values;
    calculating a scalar quantity indicative of the image translation accuracy using the first and third sets of stored color values and the stored proportional color contrast relationship; and
    converting the third set of stored color values to target gamut color values and storing these color values as a fourth set of image color values; and
    sending the fourth set of stored color values to the target device.

2. The method of claim 1, wherein the step of calculating a scalar quantity indicative of the image translation accuracy is performed utilizing a weighted proportion conservation term and a weighted aggregate image closeness term.

3. The method of claim 2, wherein greater weight is given the proportion conservation term than to the aggregate image closeness term.

4. The method of claim 2, wherein greater weight is given to the aggregate image closeness term than to the proportion conservation term.

5. The method of claim 1, wherein the intermediate color space is a perceptually ordered three dimensional color space composed of a hue axis, a value axis, and a chroma axis that are all opposed in the three dimensional space to each other by ninety degrees.

6. The perceptually ordered color space of claim 5 is constructed such that the contrasts are all the same among a plurality of neighboring colors on the same hue page and neighboring colors on different hue pages having the same value and chroma have a steady, linear rate of change in contrast reaching zero at the neutral axis.

7. The method of claim 1, wherein the step of repositioning within the intermediate color space a plurality of the color values in the first set of stored color values comprises:
    shifting within the intermediate color space all of the color values contained in the first set of color values equally and only by an amount necessary so that each color value in the first set corresponds to a color value in the second set.

8. The method of claim 1, wherein the step of repositioning within the intermediate color space a plurality of the color values in the first set of color values comprises the steps of:
    shifting within the intermediate color space all of the color values contained in the first set of stored color values equally and only by an amount necessary so that substantially all of the color values in the first set of stored color values correspond to color values in the second set of stored color values and storing the shifted color values as a third set of color values; and
    compressing a plurality of the color values contained in the third set of stored color values only by an amount necessary so that substantially all of the color values in the third set of stored color values correspond to color values in the second set of stored color values.

9. The method of claim 8, wherein the plurality of color values contained in the third set of stored color values are compressed only by an amount necessary so that each one of the color values in the third set of stored color values corresponds to a color value in the second set of stored color values.

10. The method of claim 8, wherein the step of compressing a plurality of the color values contained in the third set of stored color values is accomplished by scaling all of the color values contained in the third set of stored color values only by an amount necessary so that substantially all of the color values in the third set of stored color values correspond to color values in the second set of stored color values.

11. The method of claim 8, wherein the step of compressing a plurality of the color values contained in the third set of stored color values is accomplished by scaling all of the color values contained in the third set of stored color values only by an amount necessary so that each one of the color values in the third set of stored color values corresponds to a color value in the second set of stored color values.

12. The method of claim 8, wherein the step of compressing a plurality of the color values contained in the third set of stored color values is accomplished by clipping one or more of the color values contained in the third set of stored color values only by an amount necessary so that the one or more color values correspond to color values in the second set of stored color values.

13. A method for calculating the color image translation accuracy of a color image translated from a source device gamut to a target device gamut comprising the steps of:
   converting all source image color values to intermediate color space color values and storing these converted color values as a first set of color values;
   selecting a first, a second and a third color value from the stored first set of color values and storing these color values;
   calculating a first color contrast value between the selected first and second color values and storing the first calculated color contrast value;
   calculating a second color contrast value between the selected first and third color values and storing the second calculated color contrast value;
   employing the first and second calculated color contrast values to establish a proportional color contrast relationship between the first and second and the first and third selected color values and storing the proportional color contrast relationship;
   converting all target device gamut color values to intermediate color space color values and storing these converted target device gamut color values as a second set of color values;
   comparing the first set of stored color values to the second set of stored color values;
   shifting within the intermediate color space all of the color values in the first set of stored color values so that a plurality of the color values in the first set of stored color values correspond to color values in the second set of stored color values and storing these repositioned color values as a third set of color values;
   calculating a scalar quantity indicative of the image translation accuracy using the first and third sets of stored color values and the stored proportional color contrast relationship; and
   converting the third set of stored color values to target gamut color values and storing these color values as a fourth set of color values; and
   sending the fourth set of stored color values to the target device.

14. The method of claim 13, wherein the step of calculating the image translation accuracy is performed utilizing a weighted proportion conservation term and a weighted aggregate image closeness term.

15. The method of claim 14, wherein greater weight is given to the proportion conservation term than to the aggregate image closeness term.

16. The method of claim 14, wherein greater weight is given to the aggregate image closeness term than to the proportion conservation term.

17. The method of claim 13, wherein the intermediate color space is a perceptually ordered three dimensional color space composed of a hue axis, a value axis, and a chroma axis that are all opposed in the three dimensional space to each other by ninety degrees.

18. The perceptually ordered color space of claim 13 is constructed such that the contrasts are all the same among a plurality of neighboring colors on the same hue page and neighboring colors on different hue pages having the same value and chroma have a steady, linear rate of change in contrast reaching zero at the neutral axis.

19. A method for calculating the color image translation accuracy of a color image translated from a source device gamut to a target device gamut comprising the steps of:
   converting all source image color values to intermediate color space color values and storing these converted image color values as a first set of color values;
   selecting a first, a second and a third color value from the stored first set of color values and storing these color values;
   calculating a first color contrast value between the selected first and second color values and storing the first calculated color contrast value;
   calculating a second color contrast value between the selected first and third color values and storing the second calculated color contrast value;
   employing the first and second calculated color contrast values to establish a proportional color contrast relationship between the first and second and the first and third selected color values and storing the proportional color contrast relationship;
   converting all target device gamut color values to intermediate color space color values and storing these converted target device gamut color values as a second set of color values;
   comparing the first set of stored color values to the second set of stored color values;
   shifting within the intermediate color space all of the color values in the first set of stored color values so that a plurality of the color values correspond to a color value in the second set of stored color values and storing these repositioned color values as a third set of color values;
   compressing within the intermediate color space one or more of the color values in the third set of stored color values so that a plurality of the color values in the third set of stored color values correspond to a color value in the second set of stored color values and storing these repositioned color values as a fourth set of color values;
   calculating a scalar quantity indicative of the image translation accuracy using the first and fourth sets of stored color values and the at least one stored proportional relationship; and
   converting the fourth set of stored color values to target gamut color values and storing these color values as a fifth set of color values; and
   sending the fifth set of stored color values to the target device.

20. The method of claim 19, wherein the plurality of color values contained in the third set of stored color values are compressed only by an amount necessary so that each one of the color values in the third set of stored color values correspond to color values in the second set of stored color values.

21. The method of claim 20, wherein greater weight is given to the proportion conservation term than to the aggregate image closeness term.

22. The method of claim 20, wherein greater weight is given to the aggregate image closeness term than to the proportion conservation term.

23. The method of claim 19, wherein the step of compressing a plurality of the color values contained in the third set of stored color values is accomplished by scaling all of the color values contained in the third set of stored color values only by an amount necessary so that each one of the color values in the third set of stored color values corresponds to a color value in the second set of stored color values.

24. The method of claim 19, wherein the step of compressing a plurality of the color values contained in the third set of stored color values is accomplished by clipping all of the color values contained in the third set of stored color values only by an amount necessary so that each one of the color values in the third set of stored color values corresponds to a color value in the second set of stored color values.

25. The method of claim 19, wherein the step of calculating the image translation accuracy is performed utilizing a weighted proportion conservation term and a weighted aggregate image closeness term.

26. The method of claim 19, wherein the intermediate color space is a perceptually ordered three dimensional color space composed of a hue axis, a value axis, and a chroma axis that are all opposed in the three dimensional space to each other by ninety degrees.

27. The perceptually ordered color space of claim 19 is constructed such that the contrasts are all the same among a plurality of neighboring colors on the same hue page and neighboring colors on different hue pages having the same value and chroma have a steady, linear rate of change in contrast reaching zero at the neutral axis.

* * * * *